(12) United States Patent
Yang

(10) Patent No.: US 10,816,779 B2
(45) Date of Patent: Oct. 27, 2020

(54) WIDE-ANGLE LENS ASSEMBLY AND IMAGING DEVICE

(71) Applicant: ZHEJIANG SUNNY OPTICAL CO., LTD., Ningbo (CN)

(72) Inventor: Jian Yang, Ningbo (CN)

(73) Assignee: Zhejiang Sunny Optical Co., Ltd. (CN)

( * ) Notice: Subject to any disclaimer, the term of this patent is extended or adjusted under 35 U.S.C. 154(b) by 159 days.

(21) Appl. No.: 16/226,243

(22) Filed: Dec. 19, 2018

(65) Prior Publication Data

US 2019/0121106 A1    Apr. 25, 2019

Related U.S. Application Data

(63) Continuation of application No. PCT/CN2018/077202, filed on Feb. 26, 2018.

(51) Int. Cl.
| | | |
|---|---|---|
| *G02B 13/18* | (2006.01) | |
| *G02B 9/34* | (2006.01) | |
| *G02B 13/06* | (2006.01) | |
| *G02B 27/00* | (2006.01) | |
| *G02B 13/00* | (2006.01) | |

(52) U.S. Cl.
CPC ............ *G02B 13/06* (2013.01); *G02B 9/34* (2013.01); *G02B 13/004* (2013.01); *G02B 27/0025* (2013.01)

(58) Field of Classification Search
CPC ........ G02B 13/06; G02B 9/34; G02B 13/004; G02B 27/0025
USPC .................... 359/715, 753, 771, 781, 783
See application file for complete search history.

(56) References Cited

U.S. PATENT DOCUMENTS 8,089,698 B1 *   1/2012   Tang ............... G02B 13/06
                                                 359/644
2011/0299178 A1   12/2011  Kitahara
                           (Continued)

FOREIGN PATENT DOCUMENTS

| CN | 202003075 U | 5/2011 |
| CN | 201955534 U | 8/2011 |
| CN | 103718079 A | 4/2014 |

(Continued)

OTHER PUBLICATIONS

PCT International Search Report completed by the ISA/CN on May 21, 2018 and issued in connection with PCT/CN2018/077202, 6 pages.

*Primary Examiner* — William Choi
(74) *Attorney, Agent, or Firm* — Barnes & Thornburg LLP

(57) ABSTRACT

The present disclosure provides a wide-angle lens assembly and an imaging device equipped with the wide-angle lens assembly. The wide-angle lens assembly includes, sequentially from an object side to an image side: a first lens having a negative refractive power, where an image-side surface of the first lens is a concave surface; a second lens having a positive refractive power, where an object-side surface of the second lens is a convex surface; a third lens having a refractive power; and a fourth lens having a positive refractive power, where an image-side surface of the fourth lens is a convex surface. A sagittal height SAG12 of the image-side surface of the first lens at a maximum effective radius and the air spacing T12 on the axis between the first lens and the second lens satisfy: $1.5 \leq SAG12/T12 < 2.0$.

20 Claims, 13 Drawing Sheets

(56) References Cited

U.S. PATENT DOCUMENTS

2012/0113530 A1   5/2012   Tsai et al.
2012/0154905 A1   6/2012   Tsai

FOREIGN PATENT DOCUMENTS

CN      107238914 A    10/2017
CN      207096552U U    3/2018

* cited by examiner

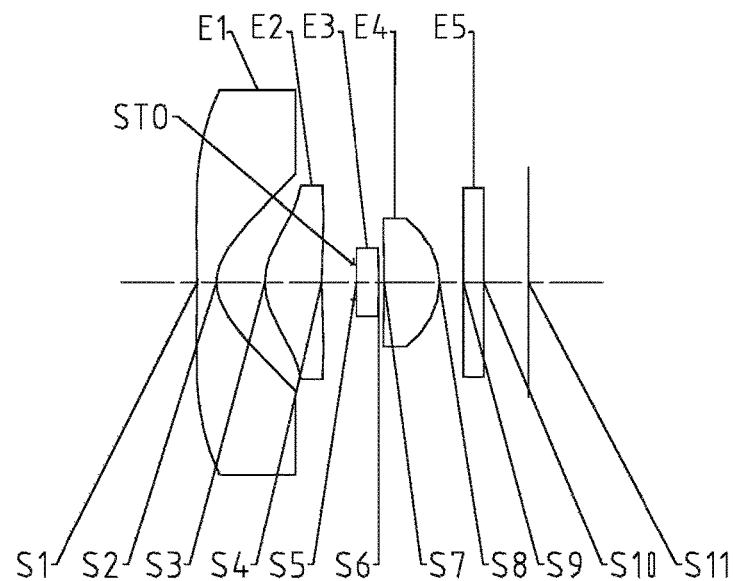
Fig. 1
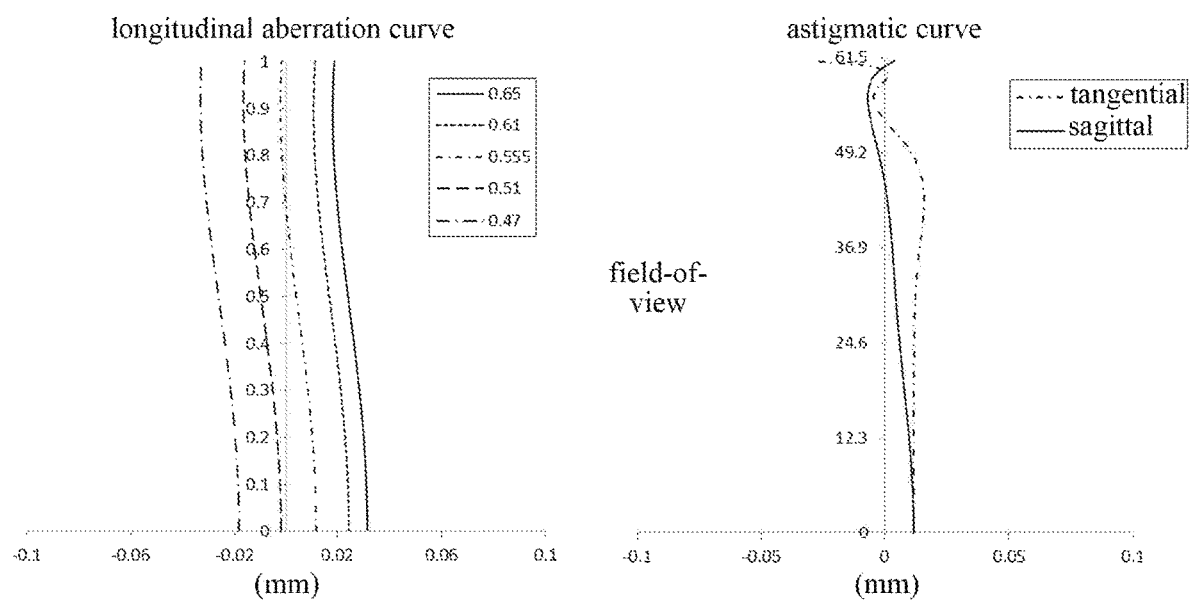
Fig. 2A
Fig. 2B

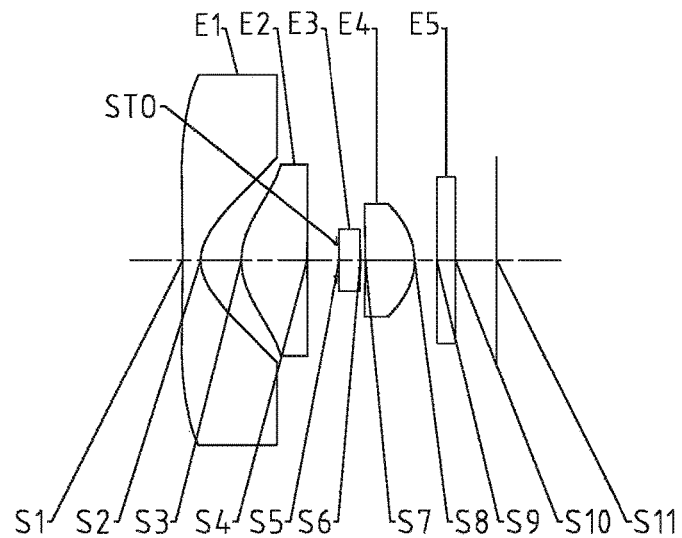
Fig. 5
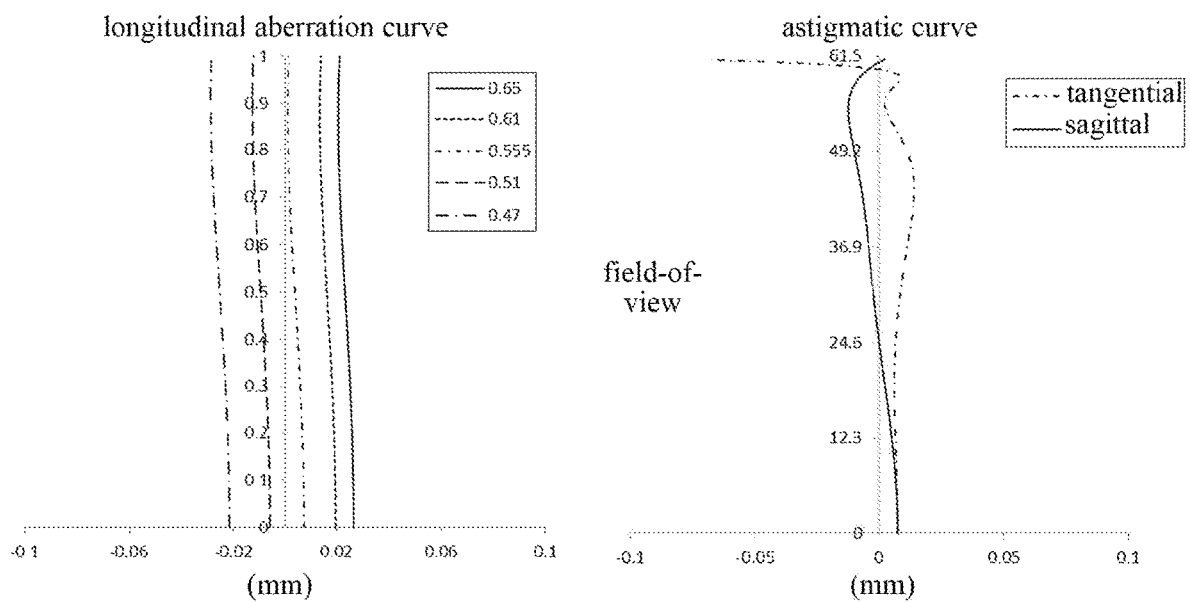
Fig. 6A
Fig. 6B

Fig. 6C                                     Fig. 6D

WIDE-ANGLE LENS ASSEMBLY AND IMAGING DEVICE

CROSS-REFERENCE TO RELATED APPLICATIONS

This application is a continuation of International Application No. PCT/CN2018/077202, filed on Feb. 26, 2018, which claims the priorities and rights to Chinese Patent Application No. 201710665300.5 and Chinese Patent Application No. 201720975086.9, filed with the China National Intellectual Property Administration (CNIPA) on Aug. 7, 2017. All of the aforementioned applications are hereby incorporated by reference in their entirety.

TECHNICAL FIELD

The present disclosure relates to a wide-angle lens assembly and an imaging device equipped with the wide-angle lens assembly.

BACKGROUND

As a subclass of the imaging lens assembly, the wide-angle lens assembly possesses characteristics of short focal length, long depth of field, etc. A relative short focal length can help to make an imaging device such as a digital camera or a smart phone lighter and thinner. A relative large depth of field can ensure that objects in a certain depth before and behind a captured subject may also be clearly imaged on the screen. In addition, the wide-angle lens assembly further possesses characteristic of large field-of-view. Under the same condition, the larger the field-of-view is, the larger the amount of information that can be obtained is. The above characteristics of the wide-angle lens assembly are advantageous in many application domains. For example, in the domains of security lens assembly, mobile phone lens assembly, vehicle-mounted lens assembly, etc., wide-angle lens assemblies are widely used.

At present, for the common wide-angle lens assembly, the total track length thereof is long and the imaging quality thereof is mediocre. With the development of portable electronic products, especially with the growing demands on the 360 degree panorama view applications, higher requirements on performances of the imaging lens assemblies such as miniaturization, ultra wide-angle and imaging quality are raised. In order to ensure the imaging quality while satisfying the miniaturization requirement, configurations of parameters of the imaging lens assemblies need to be further improved.

SUMMARY

The technical solution provided by the present disclosure at least partially solves the technical problems described above.

According to an aspect, the present disclosure provides a wide-angle lens assembly. The wide-angle lens assembly includes, sequentially from an object side to an image side: a first lens having a negative refractive power, wherein an image-side surface of the first lens is a concave surface; a second lens having a positive refractive power, wherein an object-side surface of the second lens is a convex surface; a third lens having a refractive power; and a fourth lens having a positive refractive power, wherein an image-side surface of the fourth lens is a convex surface. A sagittal height SAG12 of the image-side surface of the first lens at a maximum effective radius and an air spacing T12 on the axis between the first lens and the second lens satisfy: $1.5 \leq SAG12/T12 < 2.0$.

According to the implementations of the present disclosure, an abbe number V1 of the first lens and an abbe number V3 of the third lens satisfy: $0.4 < V3/V1 \leq 1.2$.

According to the implementations of the present disclosure, an effective focal length f of the wide-angle lens assembly and an effective focal length f3 of the third lens satisfy: $f/|f3| \leq 0.2$.

According to the implementations of the present disclosure, half of a maximal field-of-view HFOV of the wide-angle lens assembly satisfies: $TAN(HFOV) \geq 1.6$.

According to the implementations of the present disclosure, the half of the maximal field-of-view HFOV of the wide-angle lens assembly satisfies: $TAN(HFOV) \geq 1.81$.

According to the implementations of the present disclosure, the effective focal length f of the wide-angle lens assembly and an effective focal length f1 of the first lens satisfy: $-1.2 < f/f1 < -0.8$.

According to the implementations of the present disclosure, an effective focal length f4 of the fourth lens and a center thickness CT4 of the fourth lens satisfy: $1.5 < f4/CT4 < 2.5$.

According to the implementations of the present disclosure, the effective focal length f4 of the fourth lens and the center thickness CT4 of the fourth lens satisfy: $1.93 f4/CT4 2.26$.

According to the implementations of the present disclosure, the effective focal length f of the wide-angle lens assembly and a radius of curvature R2 of the image-side surface of the first lens satisfy: $1.2 < f/R2 1.7$.

According to the implementations of the present disclosure, an air spacing T23 on the axis between the second lens and the third lens and an air spacing T34 on the axis between the third lens and the fourth lens satisfy: $0 < T34/T23 < 0.3$.

According to the implementations of the present disclosure, the air spacing T23 on the axis between the second lens and the third lens and the air spacing T34 on the axis between the third lens and the fourth lens satisfy: $0.09 T34/T23 \leq 0.18$.

According to the implementations of the present disclosure, a sagittal height SAG21 of the object-side surface of the second lens at a maximum effective radius and the maximum effective radius SD21 of the object-side surface of the second lens satisfy: $0.3 < SAG21/SD21 < 0.5$.

According to the implementations of the present disclosure, the sagittal height SAG21 of the object-side surface of the second lens at the maximum effective radius and the maximum effective radius SD21 of the object-side surface of the second lens satisfy: $0.35 < SAG21/SD21 \leq 0.42$.

According to the implementations of the present disclosure, a sagittal height SAG42 of the image-side surface of the fourth lens at a maximum effective radius and the center thickness CT4 of the fourth lens satisfy: $-1.0 < SAG42/CT4 \leq -0.5$.

According to another aspect, the present disclosure provides a wide-angle lens assembly. The wide-angle lens assembly includes, sequentially from an object side to an image side: a first lens having a negative refractive power, wherein an image-side surface of the first lens is a concave surface; a second lens having a positive refractive power, wherein an object-side surface of the second lens is a convex surface; a third lens having a refractive power; and a fourth lens having a positive refractive power, wherein an image-side surface of the fourth lens is a convex surface. A sagittal height SAG21 of the object-side surface of the second lens at a maximum effective radius and the maximum effective radius SD21 of the object-side surface of the second lens satisfy: 0.3<SAG21/SD21<0.5.

According to another aspect, the present disclosure provides a wide-angle lens assembly. The wide-angle lens assembly includes, sequentially from an object side to an image side: a first lens having a negative refractive power, wherein an image-side surface of the first lens is a concave surface; a second lens having a positive refractive power, wherein an object-side surface of the second lens is a convex surface; a third lens having a refractive power; and a fourth lens having a positive refractive power, wherein an image-side surface of the fourth lens is a convex surface. A sagittal height SAG42 of the image-side surface of the fourth lens at a maximum effective radius and a center thickness CT4 of the fourth lens satisfy: −1.0<SAG42/CT4≤−0.5.

According to another aspect, the present disclosure provides an imaging device. The imaging device is equipped with the wide-angle lens assembly described above.

The wide-angle lens assembly provided by the present disclosure can better achieve the wide-angle characteristics while ensuring the miniaturization.

BRIEF DESCRIPTION OF THE DRAWINGS

By describing non-limiting implementations below in detail with reference to the accompanying drawings, other features, objectives and beneficial effects of the present disclosure will be more apparent.

FIG. 1 is a schematic structural diagram illustrating a wide-angle lens assembly according to Embodiment 1 of the present disclosure;

FIG. 2A illustrates a longitudinal aberration curve of the wide-angle lens assembly according to Embodiment 1;

FIG. 2B illustrates an astigmatic curve of the wide-angle lens assembly according to Embodiment 1;

FIG. 5 is a schematic structural diagram illustrating a wide-angle lens assembly according to Embodiment 3 of the present disclosure;

FIG. 6A illustrates a longitudinal aberration curve of the wide-angle lens assembly according to Embodiment 3;

FIG. 6B illustrates an astigmatic curve of the wide-angle lens assembly according to Embodiment 3;

FIG. 6C illustrates a distortion curve of the wide-angle lens assembly according to Embodiment 3;

FIG. 6D illustrates a relative illumination curve of the wide-angle lens assembly according to Embodiment 3;

DETAILED DESCRIPTION OF EMBODIMENTS

Figure 2C:
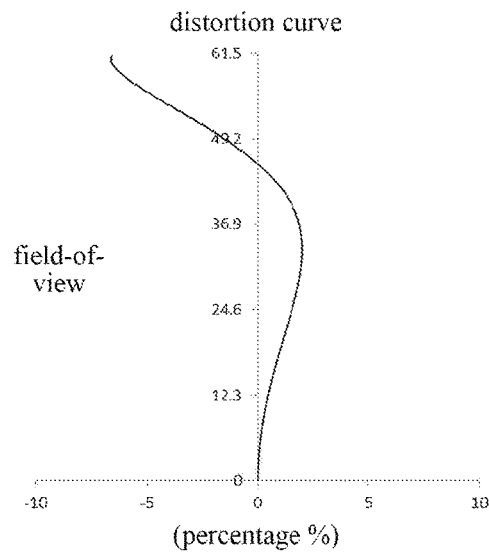
FIG. 2C illustrates a distortion curve of the wide-angle lens assembly according to Embodiment 1.

The present disclosure will be further described below in detail in combination with the accompanying drawings and the embodiments. It could be appreciated that the specific embodiments described herein are merely used for explaining the relevant invention, rather than limiting the invention. In addition, it should be noted that, for the ease of description, only the parts related to the relevant invention are shown in the accompanying drawings.

It should be understood that in the present disclosure, when an element or a layer is referred to as being "on," "connected to" or "coupled to" another element or layer, it may be directly on, connected or coupled to another element or layer, or an intervening element or layer may be present. When an element is referred to as being "directly on," "directly connected to" or "directly coupled to" another element or layer, there are no intervening elements or layers present. The same reference numerals designate the same elements throughout this specification. As used herein, the term "and/or" includes any and all combinations of one or more of the associated listed items.

It should be understood that, although terms such as "first" and "second" may be used herein to describe various elements, components, areas, layers and/or sections, these elements, components, areas, layers and/or sections should not be limited by these terms. These terms are used to distinguish one element, component, area, layer or section from another element, component, area, layer or section. Thus, a first element, component, area, layer or section discussed below could be termed a second element, component, area, layer or section without departing from the teachings of the present disclosure.

Spatially relative terms such as "beneath," "below," "lower," "above" and "upper" may be used herein for ease of description, to describe one element or feature's relation to other element(s) or feature(s) as illustrated in the accompanying drawings. It should be understood that the spatially relative terms are intended to encompass different orientations of the device in use or operation in addition to the orientation depicted in the accompanying drawings. For example, if the device in the accompanying drawings is turned over, elements described as "below" or "beneath" other elements or features would then be oriented "above" the other elements or features. Thus, the term "below" can encompass two orientations of above and below.

The terminology used herein is for the purpose of describing specific implementations only and is not intended to limit the present disclosure. As used herein, the singular forms "a," "an" and "the" are intended to include the plural forms as well, unless the context clearly indicates otherwise. It should be further understood that the terms "comprising," "including," "having" and variants thereof, when used in this specification, specify the presence of stated features, entireties, steps, operations, elements and/or components, but do not preclude the presence or addition of one or more other features, entireties, steps, operations, elements, components and/or groups thereof. As used herein, the term "and/or" includes any and all combinations of one or more of the associated listed items. Expressions such as "at least one of," when preceding a list of elements, modify the entire list of elements rather than an individual element in the list. Further, the use of "may," when describing implementations of the present disclosure, relates to "one or more implementations of the present disclosure." In addition, the term "exemplary" is intended to refer to an example or illustration.

As used herein, the terms "substantially," "about" and similar terms are used as a term of approximation and not as a term of degree, and are intended to account for the inherent deviations in measured or calculated values that would be recognized by those of ordinary skill in the art.

Unless otherwise defined, all terms (including technical and scientific terms) used herein have the same meaning as commonly understood by those of ordinary skill in the art to which the present disclosure belongs. It should be further understood that terms, such as those defined in commonly used dictionaries, should be interpreted as having a meaning that is consistent with their meaning in the context of the relevant art and will not be interpreted in an idealized or overly formal sense unless expressly so defined herein.

It should also be noted that the embodiments in the present disclosure and the features in the embodiments may be combined with each other on a non-conflict basis. The present disclosure will be described below in detail with reference to the accompanying drawings and in combination with the embodiments.

The present disclosure is further described below in combination with specific embodiments.

Embodiment 1

First, a wide-angle lens assembly according to Embodiment 1 of the present disclosure is described below with reference to FIGS. 1-2D.

FIG. 1 is a schematic structural diagram illustrating the wide-angle lens assembly according to Embodiment 1 of the present disclosure. The wide-angle lens assembly includes, sequentially from an object side to an image side, a first lens E1, a second lens E2, a third lens E3, and a fourth lens E4. The first lens E1 has an object-side surface S1 and an image-side surface S2. The second lens E2 has an object-side surface S3 and an image-side surface S4. The third lens E3 has an object-side surface S5 and an image-side surface S6. The fourth lens E4 has an object-side surface S7 and an image-side surface S8. Alternatively, the optical imaging system may further include an optical filter E5 used for filtering out infrared light and having an object-side surface S9 and an image-side surface S10. In the optical imaging system of this embodiment, an aperture STO may also be disposed to adjust the amount of light admitted. Light from an object sequentially passes through the surfaces S1-S10 and finally forms an image on the image plane S11.

The first lens E1 may have a negative refractive power and a concave image-side surface S2. The second lens E2 may have a positive refractive power and a convex object-side surface S3. In addition, the fourth lens E4 may have a positive refractive power and a convex image-side surface S8.

Figure 17:
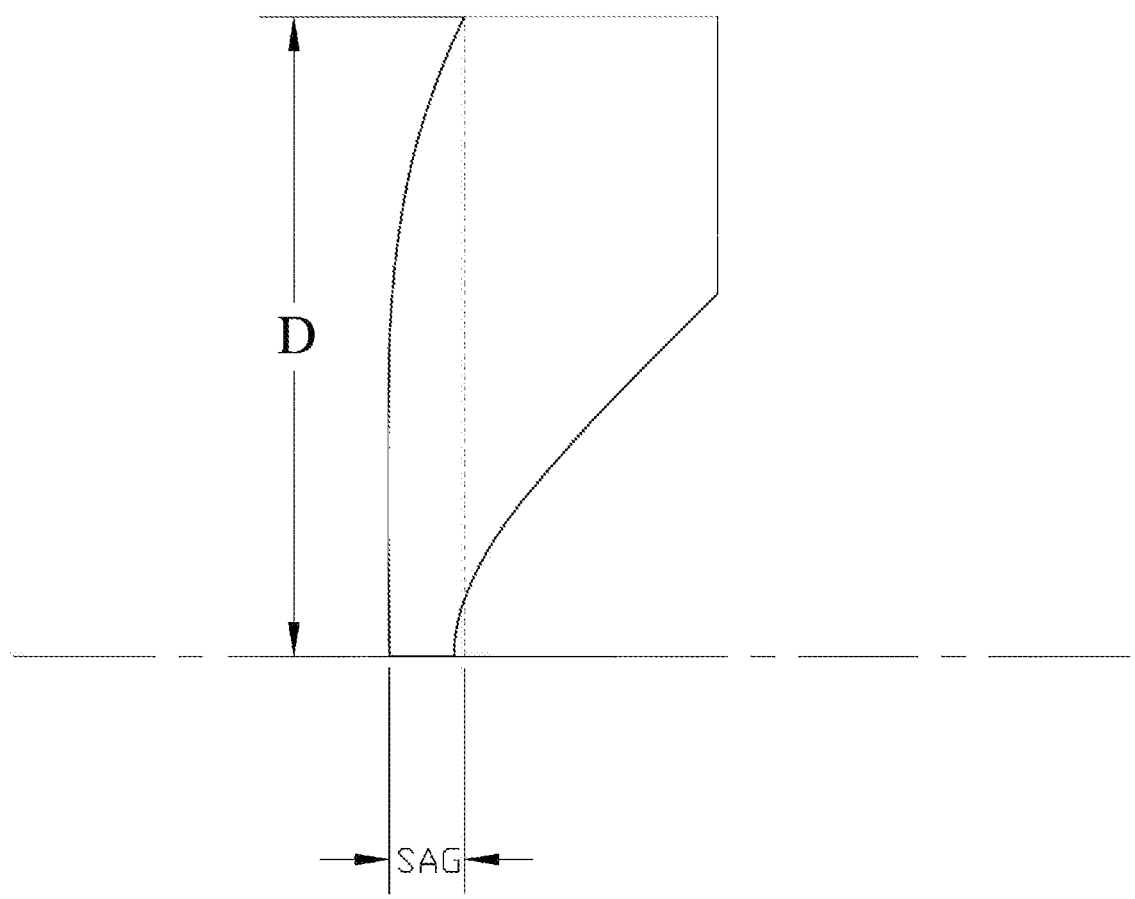
FIG. 17 is a schematic diagram illustrating a sagittal height of a surface of a lens at a maximum effective radius.

FIG. 17 is a schematic diagram illustrating a sagittal height of a surface of a lens at a maximum effective radius. The lens shown in FIG. 17 may be, for example, the first lens E1. It is assumed that the left side of FIG. 17 is the object side and the right side of FIG. 17 is the image side. For clarity, FIG. 17 illustrates the sagittal height SAG of the object-side surface of the first lens E1 at the maximum effective radius D. The sagittal height SAG represents a distance between the intersection point of the object-side surface and the optical axis and the intersection point obtained by introducing, at the maximum effective radius of the object-side surface, a perpendicular line perpendicular to the axis. Therefore, it is also easy to understand the sagittal height SAG12 of the image-side surface S2 of the first lens E1 at the maximum effective radius, the sagittal height SAG21 of the object-side surface S3 of the second lens E2 at the maximum effective radius, and the sagittal height SAG42 of the image-side surface S8 of the fourth lens E4.

The sagittal height SAG12 of the image-side surface S2 of the first lens E1 at the maximum effective radius and the air spacing T12 on the axis between the first lens and the second lens may satisfy: $1.5 \leq SAG12/T12 < 2.0$. For example, in this embodiment, $SAG12/T12=1.58$. By reasonably configuring the above parameters, the light deflection angles of the first lens E1 and the second lens E2 may be effectively distributed, so that the wide-angle characteristics can be better achieved while miniaturization is ensured.

The sagittal height SAG21 of the object-side surface S3 of the second lens E2 at the maximum effective radius and the maximum effective radius SD21 of the object-side surface S3 of the second lens E2 may satisfy: 0.3<SAG21/SD21<0.5, and more specifically, for example, 0.35≤SAG21/SD21≤0.42. For example, in this embodiment, SAG21/SD21=0.37. By reasonably configuring the above parameters, the light deflection angles of the front end of the wide-angle lens assembly may be effectively distributed, so that the wide-angle characteristics can be better achieved while the miniaturization is ensured.

The sagittal height SAG42 of the image-side surface S8 of the fourth lens E4 at the maximum effective radius and the center thickness CT4 of the fourth lens E4 may satisfy: −1.0<SAG42/CT4≤−0.5. For example, in this embodiment, SAG42/CT4=−0.54. By reasonably configuring the above parameters, the chief ray angle of the wide-angle lens assembly may be effectively adjusted, thereby increasing the relative brightness.

Table 1 shows the surface type, the radius of curvature, the thickness, the material and the conic coefficient of each lens in Embodiment 1. In Table 1, symbols of the radii of curvature represent the bending directions of corresponding surfaces. For example, the negative symbol represents curving toward the image side, and the positive symbol represents curving toward the object side.

TABLE 1

| surface number | surface type | radius of curvature (mm) | thickness (mm) | material refractive index | abbe number | conic coefficient |
|---|---|---|---|---|---|---|
| OBJ | spherical | infinite | infinite | | | |
| S1 | aspheric | −11.8067 | 0.2000 | 1.62 | 60.5 | −2.2312 |
| S2 | aspheric | 0.4714 | 0.5004 | | | −0.8618 |
| S3 | aspheric | 0.6957 | 0.5878 | 1.73 | 29.0 | −0.8704 |
| S4 | aspheric | 5.7042 | 0.3300 | | | −0.5186 |
| STO | spherical | infinite | 0.0300 | | | |
| S5 | spherical | infinite | 0.2354 | 1.73 | 29.0 | 0.0000 |
| S6 | aspheric | −8.1984 | 0.0570 | | | −10.4834 |
| S7 | aspheric | 9.1994 | 0.5719 | 1.62 | 60.5 | 0.0000 |
| S8 | aspheric | −0.7455 | 0.2467 | | | 0.1132 |
| S9 | spherical | infinite | 0.2100 | 1.52 | 64.2 | |

TABLE 1-continued

| surface number | surface type | radius of curvature (mm) | thickness (mm) | material refractive index | abbe number | conic coefficient |
|---|---|---|---|---|---|---|
| S10 | spherical | infinite | 0.4603 | | | |
| S11 | spherical | infinite | | | | |

The abbe number V1 of the first lens E1 and the abbe number V3 of the third lens E3 may satisfy: 0.4<V3/V1≤1.2. For example, as shown in Table 1, V3/V1=0.48. By reasonably configuring the relationship between the abbe numbers of the two lenses, the wide-angle characteristics may be achieved while the miniaturization of the wide-angle lens assembly is ensured, and various aberrations can be effectively corrected, thereby improving the imaging quality.

The air spacing T23 on the axis between the second lens E2 and the third lens E3 and the air spacing T34 on the axis between the third lens E3 and the fourth lens E4 may satisfy: 0<T34/T23<0.3, and more specifically, for example, 0.09T34/T23=0.18. For example, as shown in Table 1, T34/T23=0.16. Such configuration may reasonably distribute the focal length of each lens in the wide-angle lens assembly, and reduce the sensitivity of the lens assembly design to parameters.

In this embodiment, at least one of the surfaces S1-S8 is an aspheric surface. An aspheric lens is characterized in that its curvature continuously changes from the center of the lens to the periphery. In contrast to a spherical lens having a constant curvature from the center of the lens to the periphery, the aspheric lens has a better radius-of-curvature characteristic, and has advantages of reducing the distortion aberration and the astigmatic aberration, thus enabling the view to become larger and more real. The use of the aspheric lens can eliminate as much as possible the aberrations that occur during the imaging, thereby improving the imaging quality. The surface type of each surface is defined by the following formula:

$$x = \frac{ch^2}{1+\sqrt{1-(k+1)c^2h^2}} + \sum A_i h^i.$$

Here, x is the distance sagittal height to the vertex of the aspheric surface when the aspheric surface is at a position of a height h along the optical axis; c is the paraxial curvature of the aspheric surface, and c=1/R; k is the conic coefficient; and $A_i$ is the correction coefficient of the $i^{th}$ order of the aspheric surface. Table 2 below shows the high-order coefficients $A_4$, $A_6$, $A_8$, $A_{10}$, and $A_{12}$ applicable to the mirror surfaces S1-S8 in Embodiment 1.

TABLE 2

| surface number | A4 | A6 | A8 | A10 | A12 |
|---|---|---|---|---|---|
| S1 | 4.6844E−02 | −9.6299E−03 | 1.2872E−03 | −5.7000E−05 | 0 |
| S2 | −9.2236E−01 | 6.7090E−01 | −4.2290E−01 | 5.6774E−02 | 0 |
| S3 | −2.8428E−01 | −4.0157E−01 | 3.9469E−01 | −1.1175E−01 | 0 |
| S4 | −1.7420E−01 | 1.9699E−01 | −1.3978E−01 | 3.1178E−02 | 0 |
| S6 | −7.5655E−01 | 1.2502E+01 | −4.6861E+01 | 4.0085E+01 | 0 |
| S7 | −1.3701E+00 | 7.0425E+00 | −9.2735E+00 | −9.6285E+00 | 0 |
| S8 | 3.0943E−01 | 2.6121E−01 | −2.7029E+00 | 7.0344E+00 | 0 |

Table 3 below shows the effective focal lengths f1-f4 of the lenses in Embodiment 1, and the total effective focal length f and the half of the field-of-view (diagonal line) HFOV of the wide-angle lens assembly.

TABLE 3

| f1 (mm) | −0.73 | f (mm) | 0.67 |
|---|---|---|---|
| f2 (mm) | 1.03 | HFOV (deg) | 61.1 |
| f3 (mm) | 11.22 | | |
| f4 (mm) | 1.14 | | |

The effective focal length f of the wide-angle lens assembly and the effective focal length f1 of the first lens E1 may satisfy: −1.2<f/f1<−0.8. For example, as shown in Table 3, in this embodiment, f/f1=−0.92. By reasonably configuring the effective focal length f1 of the first lens E1, it may be conductive to improving the field-of-view to better achieve the wide-angle characteristics.

The effective focal length f of the wide-angle lens assembly and the effective focal length f3 of the third lens E3 may satisfy: f/|f3|≤0.2. For example, as shown in Table 3, in this embodiment, f/|f3|=0.06. By reasonably configuring the effective focal length f3 of the third lens E3, the wide-angle lens assembly can obtain a good capability to balance the field curvature.

The half of the maximal field-of-view HFOV of the wide-angle lens assembly may satisfy: TAN(HFOV)≥1.6, and more specifically, for example, TAN(HFOV)≥1.81. For example, as shown in Table 3, in this embodiment, TAN (HFOV)=1.81. By reasonably selecting the half of the maximal field-of-view, the wide-angle characteristics can be better achieved.

According to the embodiment of the present disclosure, the effective focal length f4 of the fourth lens E4 and the center thickness CT4 of the fourth lens E4 may satisfy: 1.5<f4/CT4<2.5, and more specifically, for example, 1.93≤f4/CT4≤2.26. For example, in combination with Tables 1 and 3, f4/CT4=1.99. By reasonably configuring the relationship between the effective focal length f4 of the fourth lens E4 and the center thickness CT4 of the fourth lens E4, the size of the rear end of the wide-angle lens assembly can be effectively reduced, which is conductive to the miniaturization design of the wide-angle lens assembly.

According to the embodiment of the present disclosure, the effective focal length f of the wide-angle lens assembly and the radius of curvature R2 of the image-side surface S2 of the first lens E1 satisfy: 1.2<f/R2≤1.7. For example, in combination with Tables 1 and 3, f/R2=1.42. By reasonably configuring the surface type of the image-side surface S2 of the first lens E1, the astigmatism of the wide-angle lens assembly may be effectively balanced.

Figure 2D:
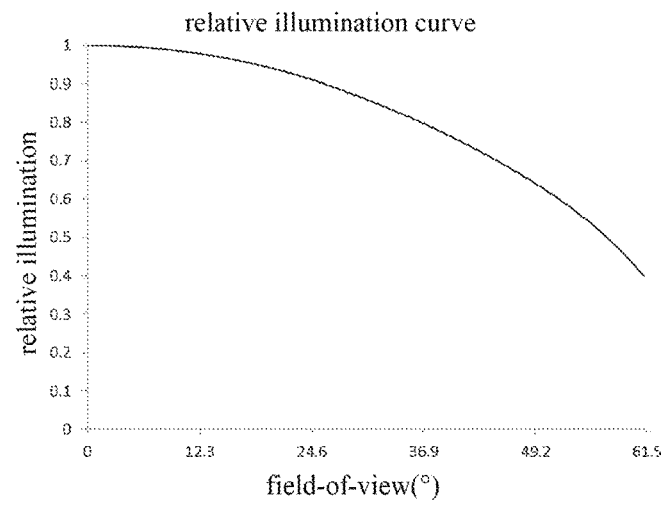
FIG. 2D illustrates a relative illumination curve of the wide-angle lens assembly according to Embodiment 1.

FIG. 2A illustrates the longitudinal aberration curve of the wide-angle lens assembly according to Embodiment 1, representing deviations of focal points of light of different wavelengths converged after passing through the optical system. FIG. 2B illustrates the astigmatic curve of the wide-angle lens assembly according to Embodiment 1, representing a curvature of the tangential image plane and a curvature of the sagittal image plane. FIG. 2C illustrates the distortion curve of the wide-angle lens assembly according to Embodiment 1, representing amounts of distortion at different viewing angles. FIG. 2D illustrates the relative illumination curve of the wide-angle lens assembly according to Embodiment 1, representing relative illuminations corresponding to different image heights on the image plane. It can be seen from FIGS. 2A-2D that the wide-angle lens assembly according to Embodiment 1 can achieve a good imaging quality.

Embodiment 2

Figure 3:
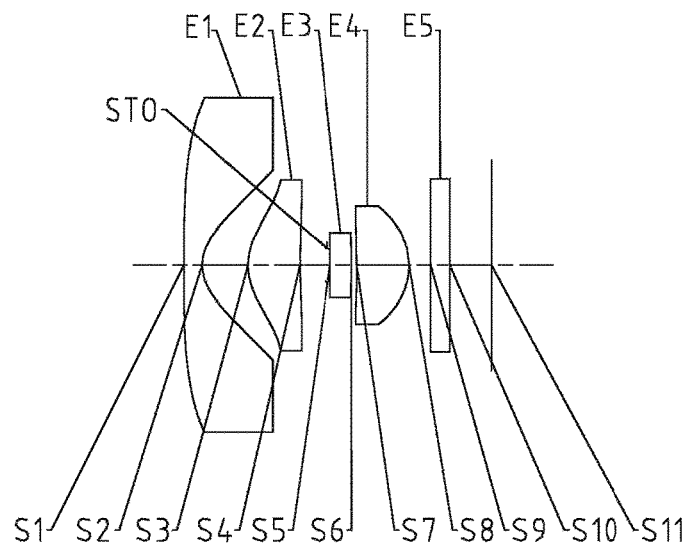
FIG. 3 is a schematic structural diagram illustrating a wide-angle lens assembly according to Embodiment 2 of the present disclosure.

A wide-angle lens assembly according to Embodiment 2 of the present disclosure is described below with reference to FIGS. 3-4D. In this embodiment and the following embodiments, for the purpose of brevity, the description of parts similar to those in Embodiment 1 will be omitted. FIG. 3 is a schematic structural diagram illustrating the wide-angle lens assembly according to Embodiment 2 of the present disclosure.

As shown in FIG. 3, the wide-angle lens assembly includes, sequentially from an object side to an image side, four lenses E1-E4. The first lens E1 has an object-side surface S1 and an image-side surface S2. The second lens E2 has an object-side surface S3 and an image-side surface S4. The third lens E3 has an object-side surface S5 and an image-side surface S6. The fourth lens E4 has an object-side surface S7 and an image-side surface S8. Alternatively, the optical imaging system may further include an optical filter E5 used for filtering out infrared light and having an object-side surface S9 and an image-side surface S10. In the optical imaging system of this embodiment, an aperture STO may also be disposed to adjust the amount of light admitted. Light from an object sequentially passes through the surfaces S1-S10 and finally forms an image on an image plane S11.

Table 4 shows the surface type, the radius of curvature, the thickness, the material and the conic coefficient of each lens in Embodiment 2. Table 5 shows the high-order coefficients of each surface in Embodiment 2. Table 6 shows the effective focal lengths f1-f4 of the lenses in Embodiment 2, and the total effective focal length f and the half of the field-of-view HFOV of the wide-angle lens assembly.

TABLE 4

| surface number | surface type | radius of curvature (mm) | thickness (mm) | material refractive index | abbe number | conic coefficient |
|---|---|---|---|---|---|---|
| OBJ | spherical | infinite | infinite | | | |
| S1 | aspheric | 1000.0000 | 0.2000 | 1.62 | 60.5 | −5.0000 |
| S2 | aspheric | 0.4559 | 0.5052 | | | −0.8666 |
| S3 | aspheric | 0.6893 | 0.5725 | 1.73 | 29 | −0.8775 |
| S4 | aspheric | 5.1063 | 0.3061 | | | −2.1101 |
| STO | spherical | infinite | 0.0300 | | | |
| S5 | spherical | infinite | 0.2364 | 1.73 | 29 | 0.0000 |
| S6 | aspheric | −7.4217 | 0.0580 | | | −9.9460E−15 |
| S7 | aspheric | 9.1663 | 0.5788 | 1.62 | 60.5 | 1.2990E−15 |
| S8 | aspheric | −0.7493 | 0.2366 | | | 0.1081 |

TABLE 4-continued

| surface number | surface type | radius of curvature (mm) | thickness (mm) | material refractive index | abbe number | conic coefficient |
|---|---|---|---|---|---|---|
| S9 | spherical | infinite | 0.2100 | 1.52 | 64.2 | |
| S10 | spherical | infinite | 0.4603 | | | |
| S11 | spherical | infinite | | | | |

TABLE 5

| surface number | A4 | A6 | A8 | A10 | A12 |
|---|---|---|---|---|---|
| S1 | 2.8743E−02 | −5.6735E−03 | 1.0365E−03 | −5.8854E−05 | 0 |
| S2 | −7.6936E−01 | 3.4368E−01 | −2.5167E−01 | 3.1893E−02 | 0 |
| S3 | −2.3508E−01 | −5.3032E−01 | 4.9436E−01 | −1.3742E−01 | 0 |
| S4 | −2.0343E−01 | 3.4725E−01 | −4.0023E−01 | 1.6882E−01 | 0 |
| S6 | −8.9376E−01 | 1.4936E+01 | −6.5435E+01 | 9.5592E+01 | 0 |
| S7 | −1.5897E+00 | 8.4218E+00 | −1.3850E+01 | −1.7874E+00 | 0 |
| S8 | 2.3742E−01 | 5.5112E−01 | −3.8162E+00 | 8.1910E+00 | 0 |

TABLE 6

| f1 (mm) | −0.74 | f (mm) | 0.67 |
|---|---|---|---|
| f2 (mm) | 1.03 | HFOV (deg) | 61.9 |
| f3 (mm) | 10.16 | | |
| f4 (mm) | 1.14 | | |

Figures 4A, 4B:
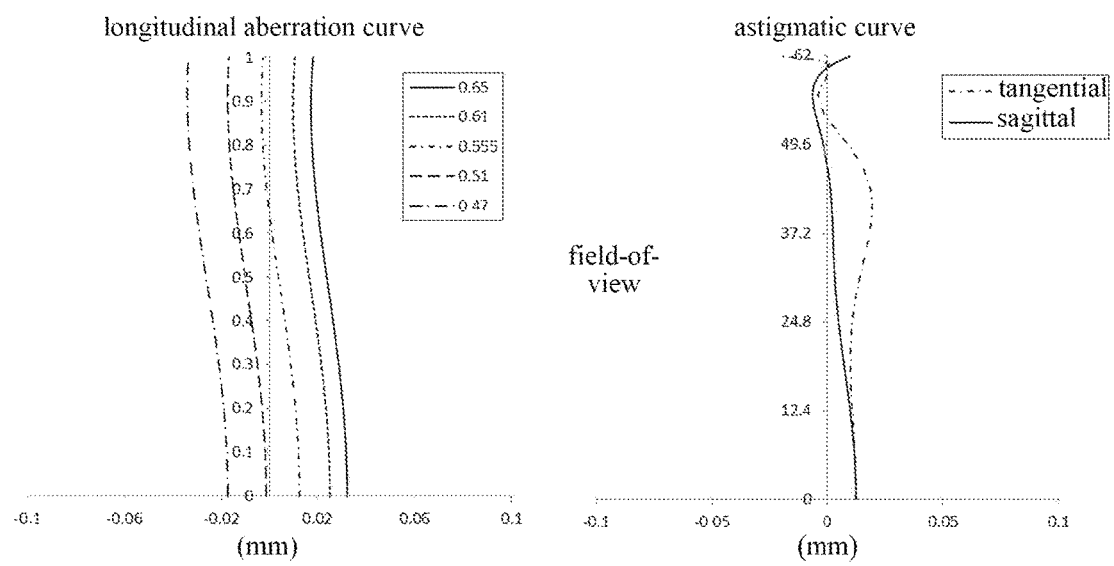
FIG. 4A illustrates a longitudinal aberration curve of the wide-angle lens assembly according to Embodiment 2.
FIG. 4B illustrates an astigmatic curve of the wide-angle lens assembly according to Embodiment 2.
Figures 4C, 4D:
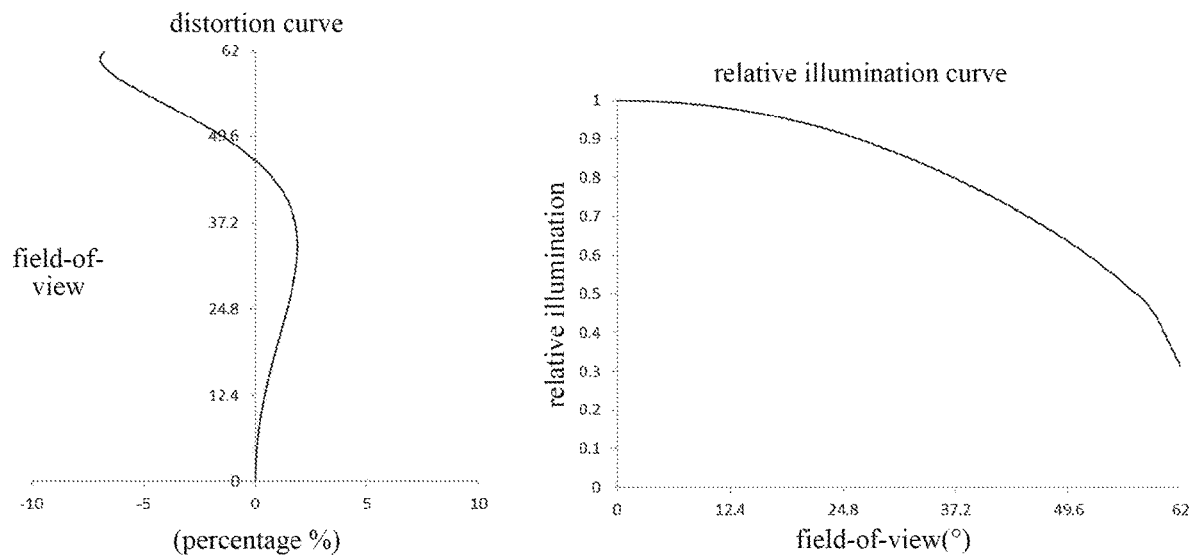
FIG. 4C illustrates a distortion curve of the wide-angle lens assembly according to Embodiment 2.
FIG. 4D illustrates a relative illumination curve of the wide-angle lens assembly according to Embodiment 2.

FIG. 4A illustrates the longitudinal aberration curve of the wide-angle lens assembly according to Embodiment 2, representing deviations of focal points of light of different wavelengths converged after passing through the optical system. FIG. 4B illustrates the astigmatic curve of the wide-angle lens assembly according to Embodiment 2, representing a curvature of the tangential image plane and a curvature of the sagittal image plane. FIG. 4C illustrates the distortion curve of the wide-angle lens assembly according to Embodiment 2, representing amounts of distortion at different viewing angles. FIG. 4D illustrates the relative illumination curve of the wide-angle lens assembly according to Embodiment 2, representing relative illuminations corresponding to different image heights on the image plane. It can be seen from FIGS. 4A-4D that the wide-angle lens assembly according to Embodiment 2 can achieve a good imaging quality.

Embodiment 3

A wide-angle lens assembly according to Embodiment 3 of the present disclosure is described below with reference to FIGS. 5-6D. In this embodiment and the following embodiments, for the purpose of brevity, the description of parts similar to those in Embodiment 1 will be omitted. FIG. 5 is a schematic structural diagram illustrating the wide-angle lens assembly according to Embodiment 3 of the present disclosure.

As shown in FIG. 5, the wide-angle lens assembly includes, sequentially from an object side to an image side, four lenses E1-E4. The first lens E1 has an object-side surface S1 and an image-side surface S2. The second lens E2 has an object-side surface S3 and an image-side surface S4. The third lens E3 has an object-side surface S5 and an image-side surface S6. The fourth lens E4 has an object-side surface S7 and an image-side surface S8. Alternatively, the optical imaging system may further include an optical filter E5 used for filtering out infrared light and having an object-side surface S9 and an image-side surface S10. In the optical imaging system of this embodiment, an aperture STO may also be disposed to adjust the amount of light admitted. Light from an object sequentially passes through the surfaces S1-S10 and finally forms an image on the image plane S11.

Table 7 shows the surface type, the radius of curvature, the thickness, the material and the conic coefficient of each lens in Embodiment 3. Table 8 shows the high-order coefficients of each surface in Embodiment 3. Table 9 shows the effective focal lengths f1-f4 of the lenses in Embodiment 3, and the total effective focal length f and the half of the field-of-view HFOV of the wide-angle lens assembly.

TABLE 7

| surface number | surface type | radius of curvature (mm) | thickness (mm) | material refractive index | abbe number | conic co-efficient |
|---|---|---|---|---|---|---|
| OBJ | spherical | infinite | infinite | | | |
| S1 | aspheric | −13.3003 | 0.2000 | 1.62 | 60.5 | −0.7707 |
| S2 | aspheric | 0.4649 | 0.4530 | | | −0.8772 |
| S3 | aspheric | 0.7542 | 0.7358 | 1.73 | 29.0 | −0.8216 |
| S4 | aspheric | −1000.0000 | 0.3348 | | | −5.0000 |
| STO | spherical | infinite | 0.0300 | | | 0.0000 |
| S5 | spherical | infinite | 0.2370 | 1.73 | 29.0 | 0.0000 |
| S6 | aspheric | −5.1326 | 0.0565 | | | −5.9969 |
| S7 | aspheric | −1000.0000 | 0.5499 | 1.62 | 60.5 | −7.5000 |
| S8 | aspheric | −0.7175 | 0.2450 | | | 0.0702 |
| S9 | spherical | infinite | 0.2100 | 1.52 | 64.2 | 0.0000 |
| S10 | spherical | infinite | 0.4603 | | | 0.0000 |
| S11 | spherical | infinite | | | | |

TABLE 8

| surface number | A4 | A6 | A8 | A10 | A12 |
|---|---|---|---|---|---|
| S1 | 2.7248E−02 | −2.6552E−03 | −1.7659E−04 | 7.0355E−05 | 0 |
| S2 | −7.6623E−01 | 3.4205E−01 | −1.5399E−01 | −4.3428E−03 | 0 |
| S3 | −2.2451E−01 | −2.5472E−01 | 2.9277E−01 | −1.1426E−01 | 0 |
| S4 | 3.3559E−02 | −3.4016E−02 | 6.7448E−02 | −7.1250E−02 | 0 |
| S6 | −3.3986E−01 | 7.7215E+00 | −7.2740E+00 | −8.8425E+01 | 0 |
| S7 | −9.7503E−01 | 5.9626E+00 | −5.1273E+00 | −2.0372E+01 | 0 |
| S8 | 3.0213E−01 | 7.1026E−01 | −3.0974E+00 | 8.0004E+00 | 0 |

TABLE 9

| f1 (mm) | −0.72 | f (mm) | 0.66 |
|---|---|---|---|
| f2 (mm) | 1.03 | HFOV (deg) | 61.1 |
| f3 (mm) | 7.03 | | |
| f4 (mm) | 1.16 | | |

FIG. 6A illustrates the longitudinal aberration curve of the wide-angle lens assembly according to Embodiment 3, representing deviations of focal points of light of different wavelengths converged after passing through the optical system. FIG. 6B illustrates the astigmatic curve of the wide-angle lens assembly according to Embodiment 3, representing a curvature of the tangential image plane and a curvature of the sagittal image plane. FIG. 6C illustrates the distortion curve of the wide-angle lens assembly according to Embodiment 3, representing amounts of distortion at different viewing angles. FIG. 6D illustrates the relative illumination curve of the wide-angle lens assembly according to Embodiment 3, representing relative illuminations corresponding to different image heights on the image plane. It can be seen from FIGS. 6A-6D that the wide-angle lens assembly according to Embodiment 3 can achieve a good imaging quality.

Embodiment 4

Figure 7:
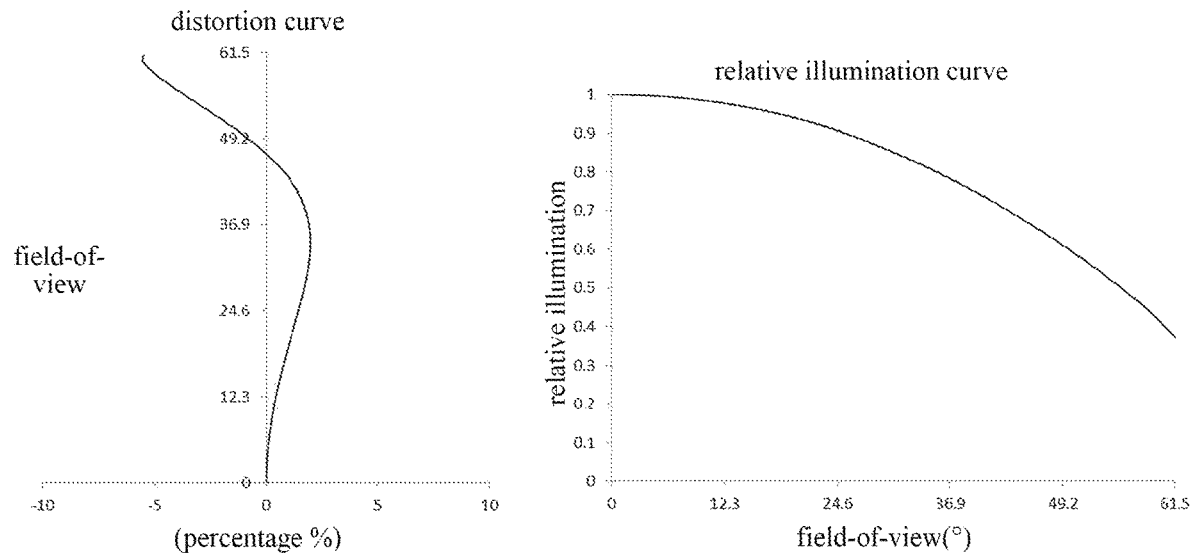
FIG. 7 is a schematic structural diagram illustrating a wide-angle lens assembly according to Embodiment 4 of the present disclosure.
Figure 7:
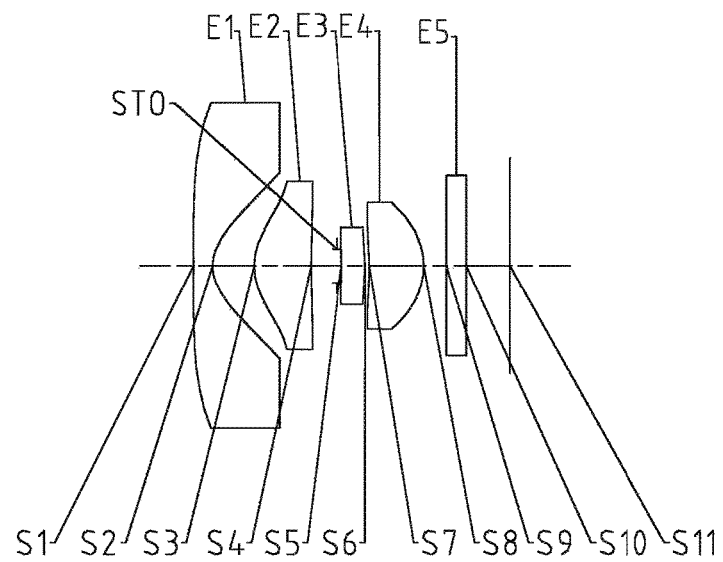

A wide-angle lens assembly according to Embodiment 4 of the present disclosure is described below with reference to FIGS. 7-8D. In this embodiment and the following embodiments, for the purpose of brevity, the description of parts similar to those in Embodiment 1 will be omitted. FIG. 7 is a schematic structural diagram illustrating the wide-angle lens assembly according to Embodiment 4 of the present disclosure.

As shown in FIG. 7, the wide-angle lens assembly includes, sequentially from an object side to an image side, four lenses E1-E4. The first lens E1 has an object-side surface S1 and an image-side surface S2. The second lens E2 has an object-side surface S3 and an image-side surface S4. The third lens E3 has an object-side surface S5 and an image-side surface S6. The fourth lens E4 has an object-side surface S7 and an image-side surface S8. Alternatively, the optical imaging lens may further include an optical filter E5 used for filtering out infrared light and having an object-side surface S9 and an image-side surface S10. In the optical imaging lens of this embodiment, an aperture STO may also be disposed to adjust the amount of light admitted. Light from an object sequentially passes through the surfaces S1-S10 and finally forms an image on the image plane S11.

Table 10 shows the surface type, the radius of curvature, the thickness, the material and the conic coefficient of each lens in Embodiment 4. Table 11 shows the high-order coefficients of each surface in Embodiment 4. Table 12 shows the effective focal lengths f1-f4 of the lenses in Embodiment 4, and the total effective focal length f and the half of the field-of-view HFOV of the wide-angle lens assembly.

TABLE 10

| surface number | surface type | radius of curvature (mm) | thickness (mm) | material refractive index | abbe number | conic coefficient |
|---|---|---|---|---|---|---|
| OBJ | spherical | infinite | infinite | | | |
| S1 | aspheric | −28.2493 | 0.2000 | 1.62 | 60.5 | 0.0000 |
| S2 | aspheric | 0.4386 | 0.4384 | | | −0.8693 |
| S3 | aspheric | 0.6569 | 0.6004 | 1.73 | 29.0 | −0.9114 |
| S4 | aspheric | 5.4777 | 0.2692 | | | −8.7634 |
| STO | spherical | infinite | 0.0525 | | | |
| S5 | spherical | −13.9752 | 0.2507 | 1.73 | 29.0 | 0.0000 |
| S6 | aspheric | −2.3887 | 0.0463 | | | −4.6553 |
| S7 | aspheric | −8.3817 | 0.5735 | 1.62 | 60.5 | −0.8111 |
| S8 | aspheric | −0.7464 | 0.2379 | | | 0.0311 |
| S9 | spherical | infinite | 0.2100 | 1.52 | 64.2 | |
| S10 | spherical | infinite | 0.4603 | | | |
| S11 | spherical | infinite | | | | |

TABLE 11

| surface number | A4 | A6 | A8 | A10 | A12 |
|---|---|---|---|---|---|
| S1 | 5.2861E−02 | −1.7530E−02 | 3.5737E−03 | −2.0234E−04 | 0 |
| S2 | −1.0161E+00 | 1.0324E+00 | −1.1898E+00 | 4.4632E−01 | 0 |
| S3 | −3.2963E−01 | −3.1765E−01 | 2.3889E−01 | −3.8146E−02 | 0 |
| S4 | −2.4141E−01 | 6.8635E−01 | −1.1795E+00 | 6.8117E−01 | 0 |
| S6 | −1.0103E+00 | 1.6547E+01 | −5.9732E+01 | 6.5549E+01 | 0 |
| S7 | −1.8476E+00 | 1.4410E+01 | −3.7633E+01 | 3.1400E+01 | 0 |
| S8 | 2.3278E−01 | 1.5256E−01 | −1.2404E+00 | 4.0794E+00 | 0 |

TABLE 12

| | | | |
|---|---|---|---|
| f1 (mm) | −0.69 | f (mm) | 0.68 |
| f2 (mm) | 0.97 | HFOV (deg) | 61.5 |
| f3 (mm) | 3.91 | | |
| f4 (mm) | 1.28 | | |

Figure 8A:
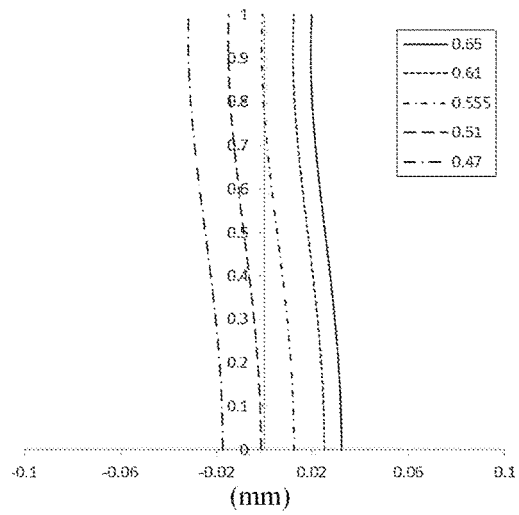
FIG. 8A illustrates a longitudinal aberration curve of the wide-angle lens assembly according to Embodiment 4.
Figure 8B:
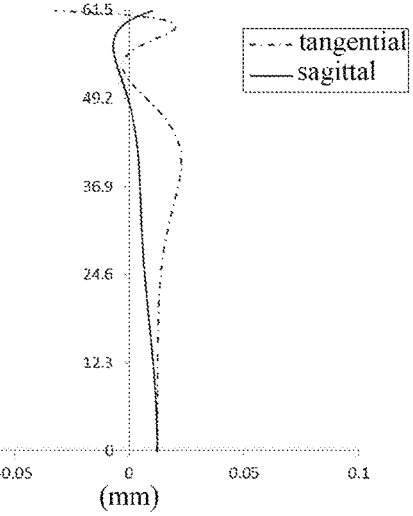
FIG. 8B illustrates an astigmatic curve of the wide-angle lens assembly according to Embodiment 4.
Figure 8C:
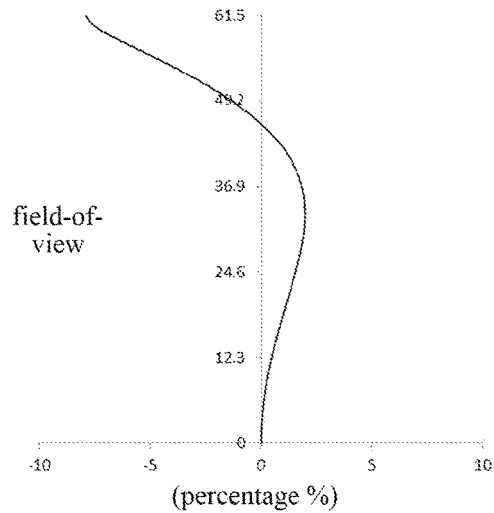
FIG. 8C illustrates a distortion curve of the wide-angle lens assembly according to Embodiment 4.
Figure 8D:
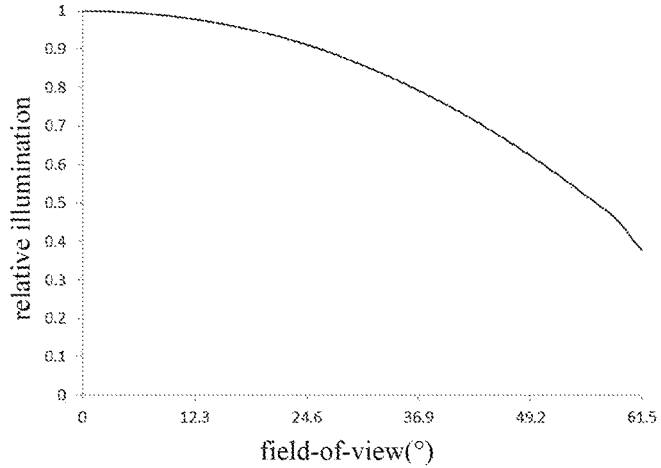
FIG. 8D illustrates a relative illumination curve of the wide-angle lens assembly according to Embodiment 4.

FIG. 8A illustrates the longitudinal aberration curve of the wide-angle lens assembly according to Embodiment 4, representing deviations of focal points of light of different wavelengths converged after passing through the optical system. FIG. 8B illustrates the astigmatic curve of the wide-angle lens assembly according to Embodiment 4, representing a curvature of the tangential image plane and a curvature of the sagittal image plane. FIG. 8C illustrates the distortion curve of the wide-angle lens assembly according to Embodiment 4, representing amounts of distortion at different viewing angles. FIG. 8D illustrates the relative illumination curve of the wide-angle lens assembly according to Embodiment 4, representing relative illuminations corresponding to different image heights on the image plane. It can be seen from FIGS. 8A-8D that the wide-angle lens assembly according to Embodiment 4 can achieve a good imaging quality.

Embodiment 5

Figure 9:
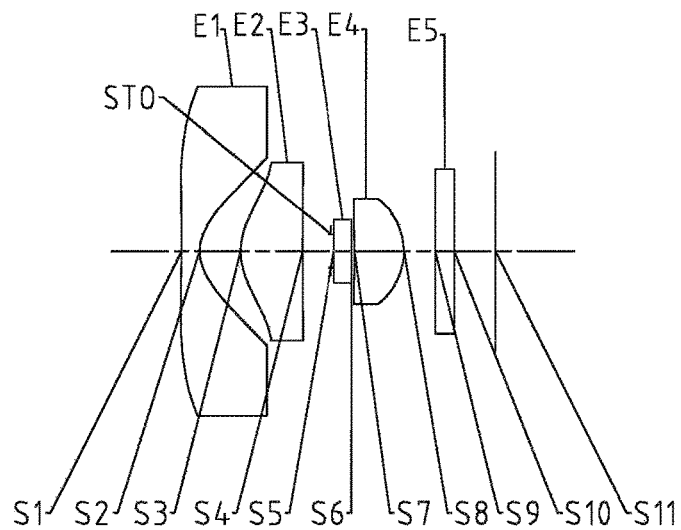
FIG. 9 is a schematic structural diagram illustrating a wide-angle lens assembly according to Embodiment 5 of the present disclosure.

A wide-angle lens assembly according to Embodiment 5 of the present disclosure is described below with reference to FIGS. 9-10D. In this embodiment and the following embodiments, for the purpose of brevity, the description of parts similar to those in Embodiment 1 will be omitted. FIG. 9 is a schematic structural diagram illustrating the wide-angle lens assembly according to Embodiment 5 of the present disclosure.

As shown in FIG. 9, the wide-angle lens assembly includes, sequentially from an object side to an image side, four lenses E1-E4. The first lens E1 has an object-side surface S1 and an image-side surface S2. The second lens E2 has an object-side surface S3 and an image-side surface S4. The third lens E3 has an object-side surface S5 and an image-side surface S6. The fourth lens E4 has an object-side surface S7 and an image-side surface S8. Alternatively, the optical imaging system may further include an optical filter E5 used for filtering out infrared light and having an object-side surface S9 and an image-side surface S10. In the opticla imaging system of this embodiment, an aperture STO may also be disposed to adjust the amount of light admitted. Light from an object sequentially passes through the surfaces S1-S10 and finally forms an image on the image plane S11.

Table 13 shows the surface type, the radius of curvature, the thickness, the material and the conic coefficient of each lens in Embodiment 5. Table 14 shows the high-order coefficients of each surface in Embodiment 5. Table 15 shows the effective focal lengths f1-f4 of the lenses in Embodiment 5, and the total effective focal length f and the half of the field-of-view HFOV of the wide-angle lens assembly.

TABLE 13

| surface number | surface type | radius of curvature (mm) | thickness (mm) | material refractive index | material abbe number | conic coefficient |
|---|---|---|---|---|---|---|
| OBJ | spherical | infinite | infinite | | | |
| S1 | aspheric | −12.0795 | 0.2000 | 1.62 | 60.5 | −2.1398 |
| S2 | aspheric | 0.4713 | 0.4562 | | | −0.8628 |
| S3 | aspheric | 0.7418 | 0.6898 | 1.73 | 29.0 | −0.8535 |
| S4 | aspheric | 10.0000 | 0.3232 | | | 1.8804E−14 |
| STO | spherical | infinite | 0.0300 | | | |
| S5 | spherical | infinite | 0.2000 | 1.73 | 29.0 | 0.0000 |
| S6 | aspheric | 1000.0000 | 0.0330 | | | −1.5857E−04 |
| S7 | aspheric | 10.0000 | 0.5515 | 1.62 | 60.5 | 2.5398E−13 |
| S8 | aspheric | −0.6939 | 0.3483 | | | 0.1353 |
| S9 | spherical | infinite | 0.2100 | 1.52 | 64.2 | 0.0000 |
| S10 | spherical | infinite | 0.4603 | | | 0.0000 |
| S11 | spherical | infinite | | | | |

TABLE 14

| surface number | A4 | A6 | A8 | A10 | A12 |
|---|---|---|---|---|---|
| S1 | 4.7973E−02 | −1.0224E−02 | 1.5140E−03 | −7.3163E−05 | 0 |
| S2 | −8.7995E−01 | 6.1362E−01 | −4.1191E−01 | 6.8569E−02 | 0 |
| S3 | −3.0055E−01 | −3.1851E−01 | 3.2903E−01 | −9.0886E−02 | 0 |
| S4 | −1.0565E−01 | 1.0654E−01 | −8.5674E−02 | 3.4701E−02 | 0 |
| S6 | −1.3472E+00 | 2.2020E+01 | −1.2231E+02 | 2.4478E+02 | 0 |
| S7 | −1.8844E+00 | 1.5765E+01 | −6.1092E+01 | 6.9079E+01 | 0 |
| S8 | 4.4970E−01 | −4.7344E−01 | 1.3197E+00 | 1.6156E+00 | 0 |

TABLE 15

| f1 (mm) | −0.73 | f (mm) | 0.68 |
|---|---|---|---|
| f2 (mm) | 1.06 | HFOV (deg) | 61.5 |
| f3 (mm) | −1368.70 | | |
| f4 (mm) | 1.07 | | |

Figures 10A, 10B:
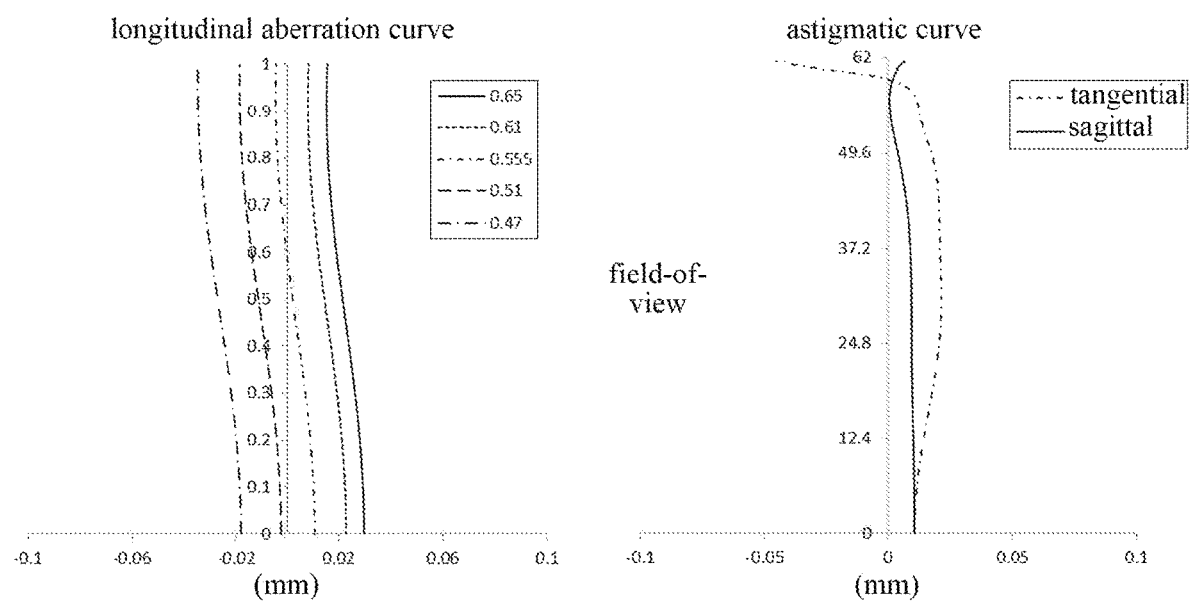
FIG. 10A illustrates a longitudinal aberration curve of the wide-angle lens assembly according to Embodiment 5.
FIG. 10B illustrates an astigmatic curve of the wide-angle lens assembly according to Embodiment 5.
Figure 10C:
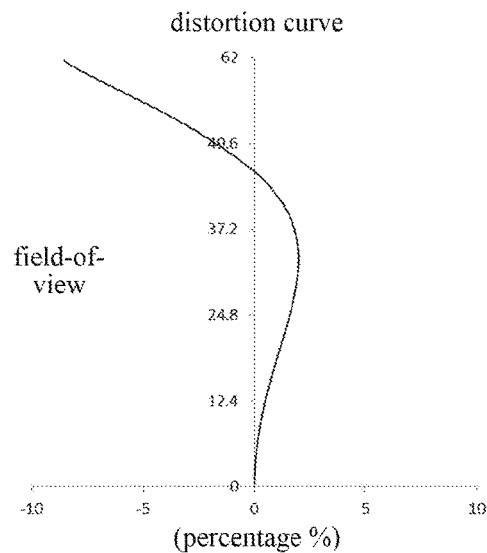
FIG. 10C illustrates a distortion curve of the wide-angle lens assembly according to Embodiment 5.
Figure 10D:
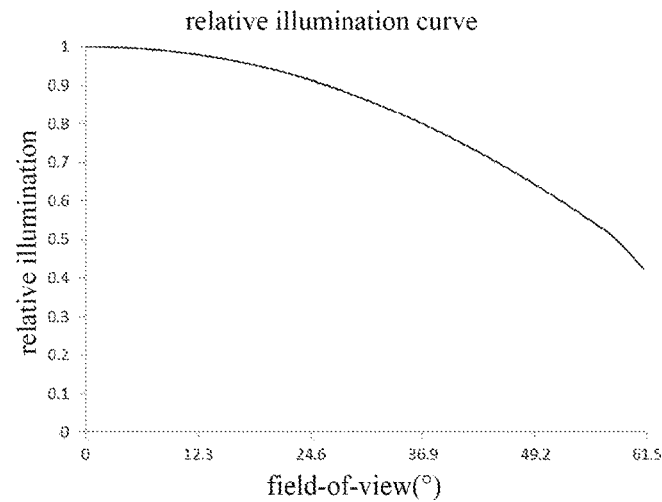
FIG. 10D illustrates a relative illumination curve of the wide-angle lens assembly according to Embodiment 5.

FIG. 10A illustrates the longitudinal aberration curve of the wide-angle lens assembly according to Embodiment 5, representing deviations of focal points of light of different wavelengths converged after passing through the optical system. FIG. 10B illustrates the astigmatic curve of the wide-angle lens assembly according to Embodiment 5, representing a curvature of the tangential image plane and a curvature of the sagittal image plane. FIG. 10C illustrates the distortion curve of the wide-angle lens assembly according to Embodiment 5, representing amounts of distortion at different viewing angles. FIG. 10D illustrates the relative illumination curve of the wide-angle lens assembly according to Embodiment 5, representing relative illuminations corresponding to different image heights on the image plane. It can be seen from FIGS. 10A-10D that the wide-angle lens assembly according to Embodiment 5 can achieve a good imaging quality.

Embodiment 6

Figure 11:
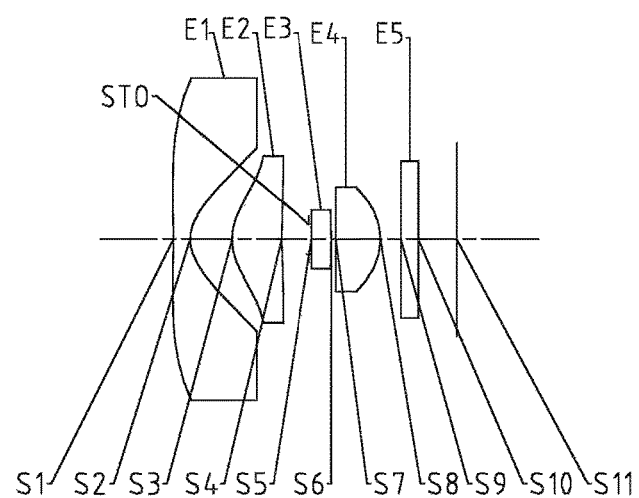
FIG. 11 is a schematic structural diagram illustrating a wide-angle lens assembly according to Embodiment 6 of the present disclosure.

A wide-angle lens assembly according to Embodiment 6 of the present disclosure is described below with reference to FIGS. 11-12D. In this embodiment and the following embodiments, for the purpose of brevity, the description of parts similar to those in Embodiment 1 will be omitted. FIG. 11 is a schematic structural diagram illustrating the wide-angle lens assembly according to Embodiment 6 of the present disclosure.

As shown in FIG. 11, the wide-angle lens assembly includes, sequentially from an object side to an image side, four lenses E1-E4. The first lens E1 has an object-side surface S1 and an image-side surface S2. The second lens E2 has an object-side surface S3 and an image-side surface S4. The third lens E3 has an object-side surface S5 and an image-side surface S6. The fourth lens E4 has an object-side surface S7 and an image-side surface S8. Alternatively, the optical imaging system may further include an optical filter E5 used for filtering out infrared light and having an object-side surface S9 and an image-side surface S10. In the optical imaging system of this embodiment, an aperture STO may also be disposed to adjust the amount of light admitted. Light from an object sequentially passes through the surfaces S1-S10 and finally forms an image on the image plane S11.

Table 16 shows the surface type, the radius of curvature, the thickness, the material and the conic coefficient of each lens in Embodiment 6. Table 17 shows the high-order coefficients of each surface in Embodiment 6. Table 18 shows the effective focal lengths f1-f4 of the lenses in Embodiment 6, and the total effective focal length f and the half of the field-of-view HFOV of the wide-angle lens assembly.

TABLE 16

| | | radius of | | material | | |
| surface number | surface type | curvature (mm) | thickness (mm) | refractive index | abbe number | conic coefficient |
|---|---|---|---|---|---|---|
| OBJ | spherical | infinite | infinite | | | |
| S1 | aspheric | −12.6117 | 0.2000 | 1.62 | 60.5 | −2.1259E−15 |
| S2 | aspheric | 0.4687 | 0.5020 | | | −0.8634 |
| S3 | aspheric | 0.6956 | 0.5943 | 1.73 | 29.0 | −0.8702 |
| S4 | aspheric | 4.7763 | 0.3333 | | | −3.1433 |
| STO | spherical | infinite | 0.0300 | | | |
| S5 | aspheric | 43.0572 | 0.2372 | 1.73 | 29.0 | −10.0000 |
| S6 | aspheric | −10.9193 | 0.0557 | | | −1.1898E−13 |
| S7 | aspheric | 7.0897 | 0.5349 | 1.62 | 60.5 | −1.9189E−15 |
| S8 | aspheric | −0.7361 | 0.2435 | | | 0.1245 |
| S9 | spherical | infinite | 0.2100 | 1.52 | 64.2 | |
| S10 | spherical | infinite | 0.4603 | | | |
| S11 | spherical | infinite | | | | |

TABLE 17

| surface number | A4 | A6 | A8 | A10 | A12 |
|---|---|---|---|---|---|
| S1 | 4.7397E−02 | −1.0056E−02 | 1.4271E−03 | −7.2624E−05 | 0 |
| S2 | −9.2742E−01 | 7.0425E−01 | −4.7675E−01 | 7.8567E−02 | 0 |
| S3 | −2.8921E−01 | −3.4703E−01 | 3.0841E−01 | −7.2107E−02 | 0 |
| S4 | −1.9191E−01 | 2.5841E−01 | −2.4593E−01 | 9.1735E−02 | 0 |
| S5 | −2.6681E−01 | 1.3666E+00 | −5.4627E+01 | 4.9190E+02 | −1.5904E−12 |
| S6 | −8.5171E−01 | 9.4886E+00 | −3.0552E+01 | 2.6412E+01 | 0 |
| S7 | −1.3381E+00 | 5.3330E+00 | 2.0469E−01 | −2.2110E+01 | 0 |
| S8 | 3.2926E−01 | 4.8221E−01 | −4.2387E+00 | 1.1240E+01 | 0 |

TABLE 18

| | | | |
|---|---|---|---|
| f1 (mm) | −0.72 | f (mm) | 0.65 |
| f2 (mm) | 1.04 | HFOV (deg) | 61.9 |
| f3 (mm) | 11.88 | | |
| f4 (mm) | 1.10 | | |

Figure 12A:
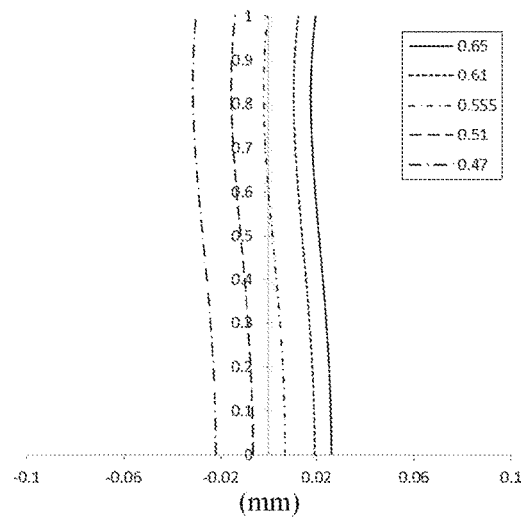
FIG. 12A illustrates a longitudinal aberration curve of the wide-angle lens assembly according to Embodiment 6.
Figure 12B:
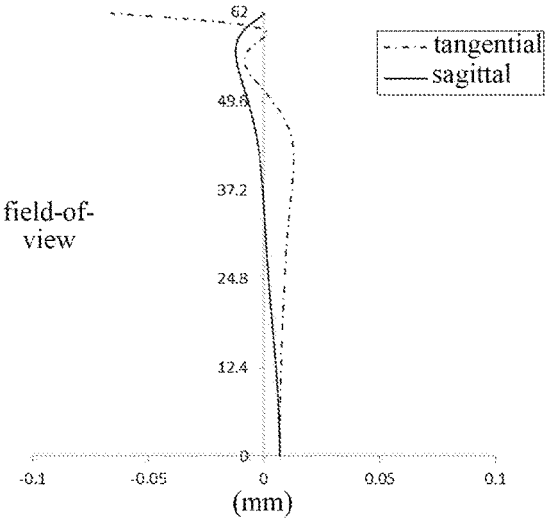
FIG. 12B illustrates an astigmatic curve of the wide-angle lens assembly according to Embodiment 6.
Figure 12C:
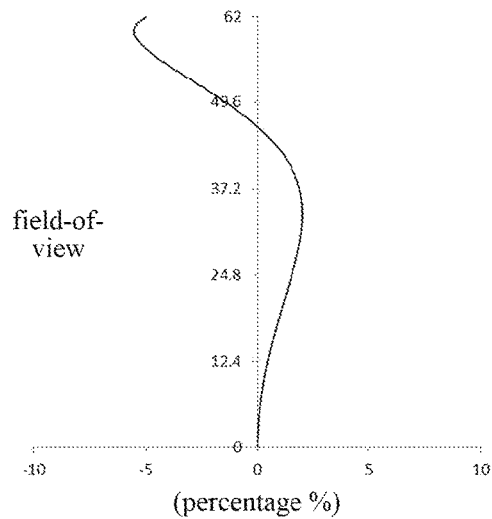
FIG. 12C illustrates a distortion curve of the wide-angle lens assembly according to Embodiment 6.
Figure 12D:
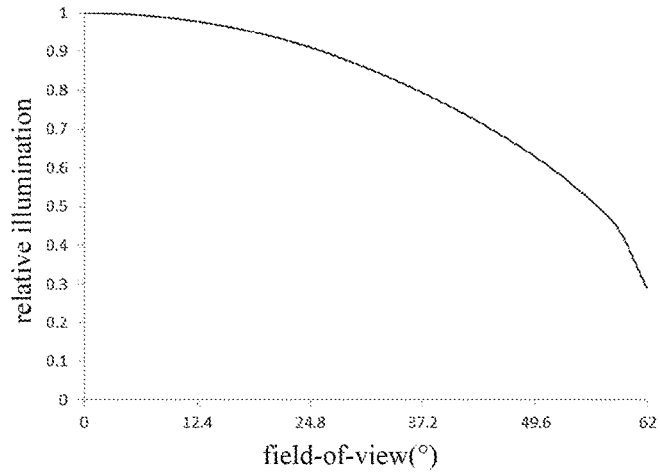
FIG. 12D illustrates a relative illumination curve of the wide-angle lens assembly according to Embodiment 6.

FIG. 12A illustrates the longitudinal aberration curve of the wide-angle lens assembly according to Embodiment 6, representing deviations of focal points of light of different wavelengths converged after passing through the optical system. FIG. 12B illustrates the astigmatic curve of the wide-angle lens assembly according to Embodiment 6, representing a curvature of the tangential image plane and a curvature of the sagittal image plane. FIG. 12C illustrates the distortion curve of the wide-angle lens assembly according to Embodiment 6, representing amounts of distortion at different viewing angles. FIG. 12D illustrates the relative illumination curve of the wide-angle lens assembly according to Embodiment 6, representing relative illuminations corresponding to different image heights on the image plane. It can be seen from FIGS. 12A-12D that the wide-angle lens assembly according to Embodiment 6 can achieve a good imaging quality.

Embodiment 7

Figure 13:
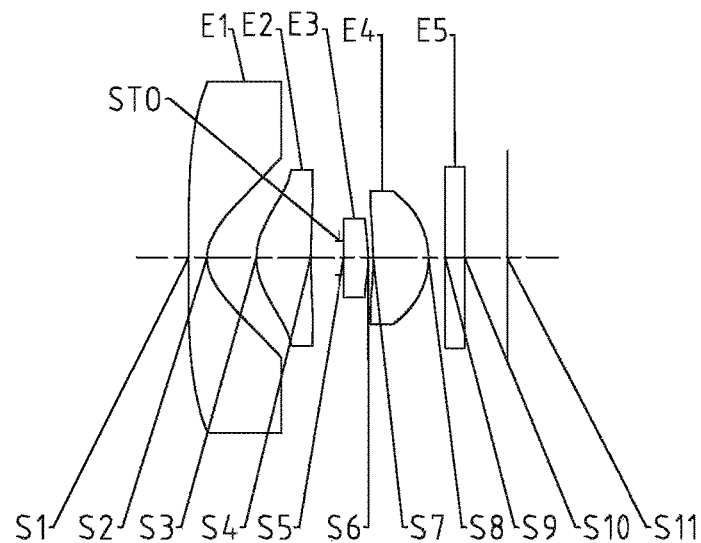
FIG. 13 is a schematic structural diagram illustrating a wide-angle lens assembly according to Embodiment 7 of the present disclosure.

A wide-angle lens assembly according to Embodiment 7 of the present disclosure is described below with reference to FIGS. 13-14D. In this embodiment and the following embodiments, for the purpose of brevity, the description of parts similar to those in Embodiment 1 will be omitted. FIG. 13 is a schematic structural diagram illustrating the wide-angle lens assembly according to Embodiment 7 of the present disclosure.

As shown in FIG. 13, the wide-angle lens assembly includes, sequentially from an object side to an image side, four lenses E1-E4. The first lens E1 has an object-side surface S1 and an image-side surface S2. The second lens E2 has an object-side surface S3 and an image-side surface S4. The third lens E3 has an object-side surface S5 and an image-side surface S6. The fourth lens E4 has an object-side surface S7 and an image-side surface S8. Alternatively, the optical imaging system may further include an optical filter E5 used for filtering out infrared light and having an object-side surface S9 and an image-side surface S10. In the optical imaging system of this embodiment, an aperture STO may also be disposed to adjust the amount of light admitted. Light from an object sequentially passes through the surfaces S1-S10 and finally forms an image on the image plane S11.

Table 19 shows the surface type, the radius of curvature, the thickness, the material and the conic coefficient of each lens in Embodiment 7. Table 20 shows the high-order coefficients of each surface in Embodiment 7. Table 21 shows the effective focal lengths f1-f4 of the lenses in Embodiment 7, and the total effective focal length f and the half of the field-of-view HFOV of the wide-angle lens assembly.

TABLE 19

| surface number | surface type | radius of curvature (mm) | thickness (mm) | material refractive index | material abbe number | conic coefficient |
|---|---|---|---|---|---|---|
| OBJ | spherical | infinite | infinite | | | |
| S1 | aspheric | −424.9978 | 0.2000 | 1.62 | 60.5 | −10.0000 |
| S2 | aspheric | 0.4450 | 0.5345 | | | −0.8803 |
| S3 | aspheric | 0.6862 | 0.5882 | 1.73 | 29.0 | −0.8830 |
| S4 | aspheric | 5.2123 | 0.3121 | | | 7.7802E−16 |
| STO | spherical | infinite | 0.0501 | | | |
| S5 | spherical | −231.0644 | 0.2667 | 1.50 | 69.2 | 0.0000 |
| S6 | aspheric | −1.8361 | 0.0545 | | | −1.7037 |
| S7 | aspheric | −65.3611 | 0.5996 | 1.62 | 60.5 | 2.2171E−12 |
| S8 | aspheric | −0.8345 | 0.1797 | | | 0.1117 |
| S9 | spherical | infinite | 0.2100 | 1.52 | 64.2 | |
| S10 | spherical | infinite | 0.4603 | | | |
| S11 | spherical | infinite | | | | |

TABLE 20

| surface number | A4 | A6 | A8 | A10 | A12 |
|---|---|---|---|---|---|
| S1 | 2.3974E−02 | −4.3517E−03 | 5.9793E−04 | 1.7367E−06 | 0 |
| S2 | −7.8139E−01 | 3.7971E−01 | −3.4547E−01 | 9.5767E−02 | 0 |
| S3 | −2.0681E−01 | −4.4696E−01 | 3.3855E−01 | −8.1318E−02 | 0 |
| S4 | −1.8355E−01 | 3.9193E−01 | −5.8039E−01 | 2.7825E−01 | 0 |
| S6 | −1.8402E+00 | 2.1193E+01 | −5.4949E+01 | 2.8616E+01 | 0 |
| S7 | −2.1734E+00 | 1.2391E+01 | −2.6040E+01 | 1.8816E+01 | 0 |
| S8 | 9.9263E−02 | −8.6777E−02 | −3.0331E−01 | 1.7638E+00 | 0 |

TABLE 21

| f1 (mm) | −0.72 | f (mm) | 0.66 |
|---|---|---|---|
| f2 (mm) | 1.03 | HFOV (deg) | 61.5 |
| f3 (mm) | 3.70 | | |
| f4 (mm) | 1.36 | | |

Figures 14A, 14B:
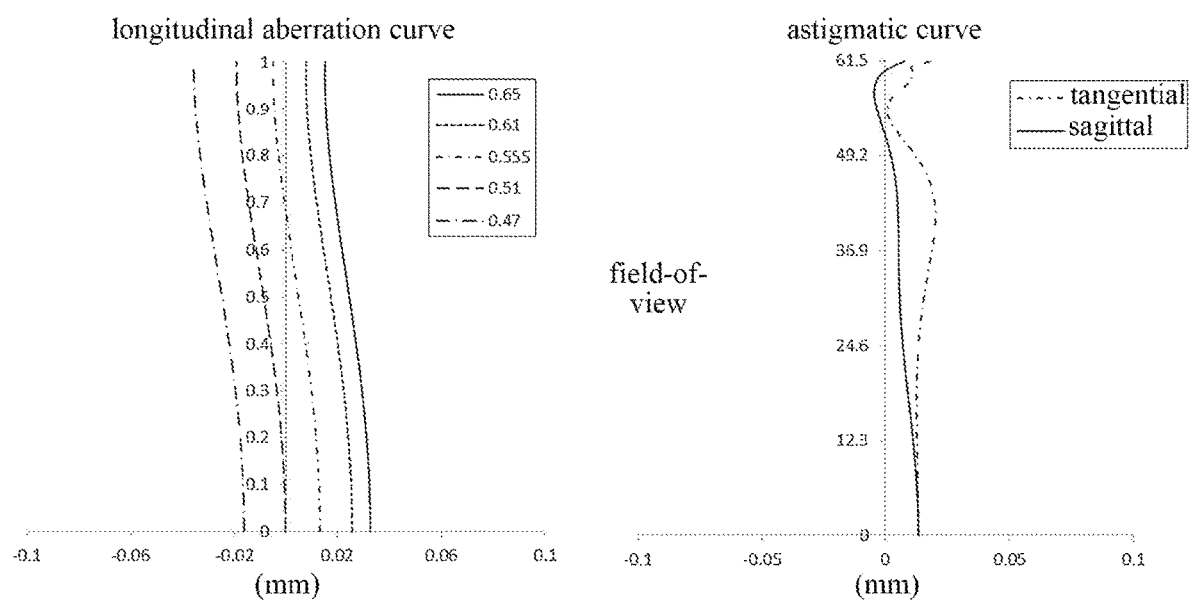
FIG. 14A illustrates a longitudinal aberration curve of the wide-angle lens assembly according to Embodiment 7.
FIG. 14B illustrates an astigmatic curve of the wide-angle lens assembly according to Embodiment 7.
Figures 14C, 14D:
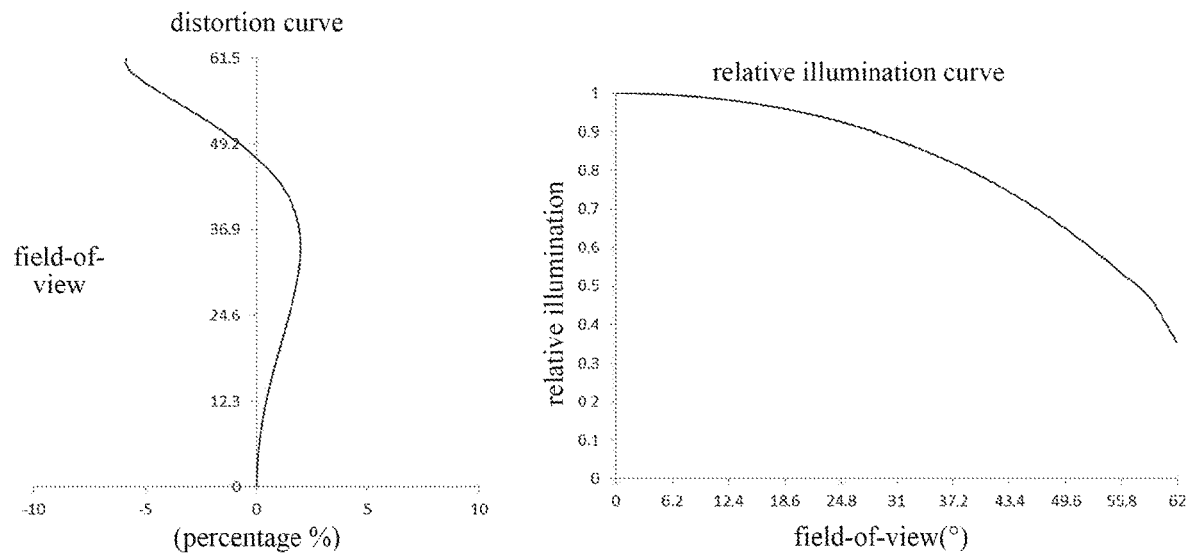
FIG. 14C illustrates a distortion curve of the wide-angle lens assembly according to Embodiment 7.
FIG. 14D illustrates a relative illumination curve of the wide-angle lens assembly according to Embodiment 7.

FIG. 14A illustrates the longitudinal aberration curve of the wide-angle lens assembly according to Embodiment 7, representing deviations of focal points of light of different wavelengths converged after passing through the optical system. FIG. 14B illustrates the astigmatic curve of the wide-angle lens assembly according to Embodiment 7, representing a curvature of the tangential image plane and a curvature of the sagittal image plane. FIG. 14C illustrates the distortion curve of the wide-angle lens assembly according to Embodiment 7, representing amounts of distortion at different viewing angles. FIG. 14D illustrates the relative illumination curve of the wide-angle lens assembly according to Embodiment 7, representing relative illuminations corresponding to different image heights on the image plane. It can be seen from FIGS. 14A-14D that the wide-angle lens assembly according to Embodiment 7 can achieve a good imaging quality.

Embodiment 8

Figure 15:
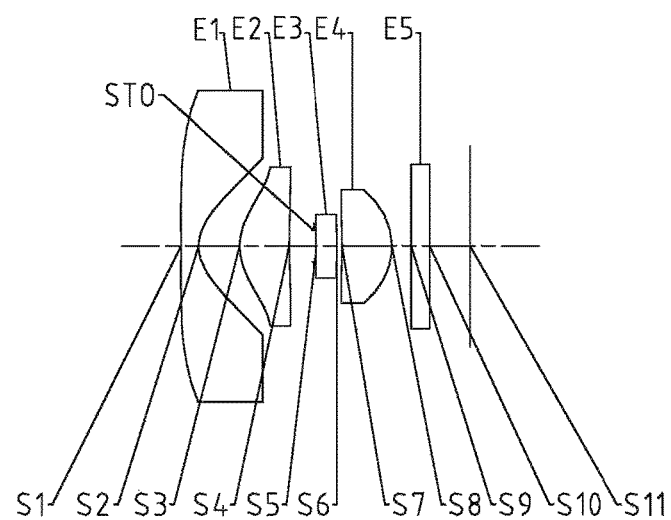
FIG. 15 is a schematic structural diagram illustrating a wide-angle lens assembly according to Embodiment 8 of the present disclosure.

A wide-angle lens assembly according to Embodiment 8 of the present disclosure is described below with reference to FIGS. 15-16D. In this embodiment and the following embodiments, for the purpose of brevity, the description of parts similar to those in Embodiment 1 will be omitted. FIG. 15 is a schematic structural diagram illustrating the wide-angle lens assembly according to Embodiment 8 of the present disclosure.

As shown in FIG. 15, the wide-angle lens assembly includes, sequentially from an object side to an image side, four lenses E1-E4. The first lens E1 has an object-side surface S1 and an image-side surface S2. The second lens E2 has an object-side surface S3 and an image-side surface S4. The third lens E3 has an object-side surface S5 and an image-side surface S6. The fourth lens E4 has an object-side surface S7 and an image-side surface S8. Alternatively, the opticla imaging system may further include an optical filter E5 used for filtering out infrared light and having an object-side surface S9 and an image-side surface S10. In the optical imaging system of this embodiment, an aperture STO may also be disposed to adjust the amount of light admitted. Light from an object sequentially passes through the surfaces S1-S10 and finally forms an image on the image plane S11.

Table 22 shows the surface type, the radius of curvature, the thickness, the material and the conic coefficient of each lens in Embodiment 8. Table 23 shows the high-order coefficients of each surface in Embodiment 8. Table 24 shows the effective focal lengths f1-f4 of the lenses in Embodiment 8, and the total effective focal length f and the half of the field-of-view HFOV of the wide-angle lens assembly.

TABLE 22

| surface number | surface type | radius of curvature (mm) | thickness (mm) | material refractive index | abbe number | conic coefficient |
|---|---|---|---|---|---|---|
| OBJ | spherical | infinite | infinite | | | |
| S1 | aspheric | −26.9092 | 0.2000 | 1.62 | 60.5 | −5.6806 |
| S2 | aspheric | 0.4463 | 0.4664 | | | −0.8691 |
| S3 | aspheric | 0.6548 | 0.5624 | 1.73 | 29.0 | −0.9125 |
| S4 | aspheric | 5.0544 | 0.2835 | | | −8.4438 |
| STO | spherical | infinite | 0.0300 | | | |
| S5 | spherical | infinite | 0.2378 | 1.73 | 29.0 | 0.0000 |
| S6 | aspheric | −5.4338 | 0.0580 | | | −3.5038E−15 |
| S7 | aspheric | 18.8162 | 0.5665 | 1.62 | 60.5 | −5.0000 |
| S8 | aspheric | −0.7395 | 0.2193 | | | 0.0939 |
| S9 | spherical | infinite | 0.2100 | 1.52 | 64.2 | |
| S10 | spherical | infinite | 0.4603 | | | |
| S11 | spherical | infinite | | | | |

TABLE 23

| surface number | A4 | A6 | A8 | A10 | A12 |
|---|---|---|---|---|---|
| S1 | 4.8621E−02 | −1.4552E−02 | 2.9565E−03 | −1.9591E−04 | 0 |
| S2 | −9.4738E−01 | 8.2748E−01 | −8.4635E−01 | 2.7612E−01 | 0 |
| S3 | −2.8651E−01 | −4.4019E−01 | 3.2530E−01 | −4.6036E−02 | 0 |
| S4 | −2.2599E−01 | 4.9887E−01 | −7.5863E−01 | 4.0220E−01 | 0 |
| S6 | −7.2952E−01 | 1.3661E+01 | −5.5998E+01 | 6.9977E+01 | 0 |
| S7 | −1.5177E+00 | 8.4172E+00 | −1.2896E+01 | −5.3322E+00 | 0 |
| S8 | 3.0609E−01 | 2.7948E−01 | −3.0901E+00 | 7.9240E+00 | 0 |

TABLE 24

| f1 (mm) | −0.71 | f (mm) | 0.67 |
|---|---|---|---|
| f2 (mm) | 0.98 | HFOV (deg) | 61.9 |
| f3 (mm) | 7.44 | | |
| f4 (mm) | 1.16 | | |

Figure 16A:
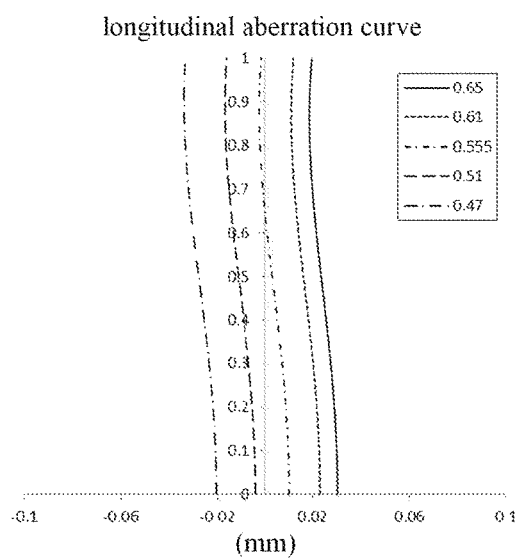
FIG. 16A illustrates a longitudinal aberration curve of the wide-angle lens assembly according to Embodiment 8.
Figure 16B:
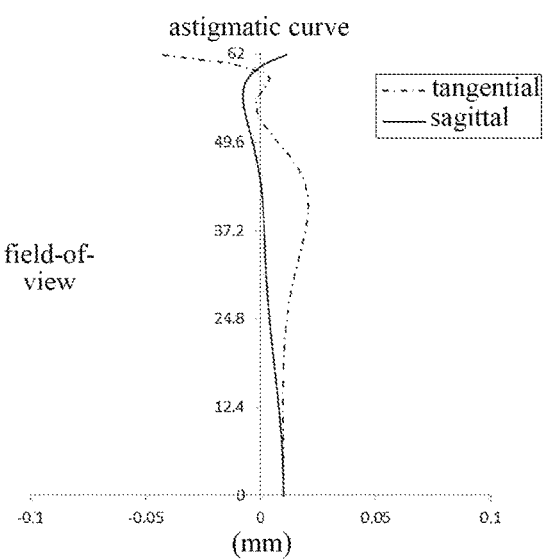
FIG. 16B illustrates an astigmatic curve of the wide-angle lens assembly according to Embodiment 8.
Figure 16C:
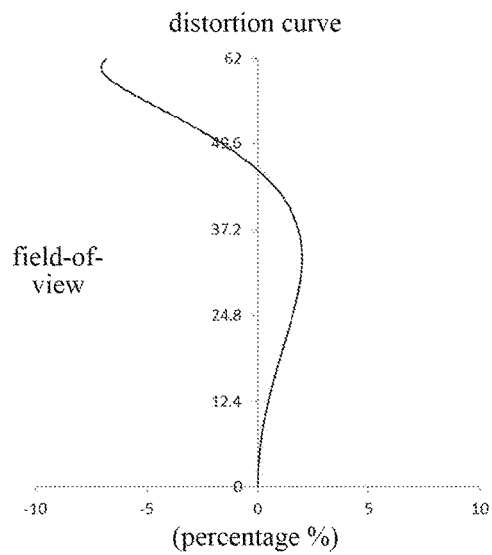
FIG. 16C illustrates a distortion curve of the wide-angle lens assembly according to Embodiment 8.
Figure 16D:
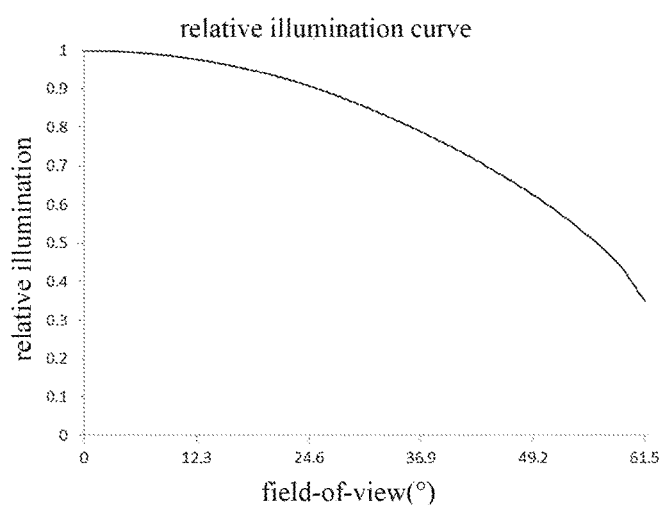
FIG. 16D illustrates a relative illumination curve of the wide-angle lens assembly according to Embodiment 8.

FIG. 16A illustrates the longitudinal aberration curve of the wide-angle lens assembly according to Embodiment 8, representing deviations of focal points of light of different wavelengths converged after passing through the optical system. FIG. 16B illustrates the astigmatic curve of the wide-angle lens assembly according to Embodiment 8, representing a curvature of the tangential image plane and a curvature of the sagittal image plane. FIG. 16C illustrates the distortion curve of the wide-angle lens assembly according to Embodiment 8, representing amounts of distortion at different viewing angles. FIG. 16D illustrates the relative illumination curve of the wide-angle lens assembly according to Embodiment 8, representing relative illuminations corresponding to different image heights on the image plane. It can be seen from FIGS. 16A-16D that the wide-angle lens assembly according to Embodiment 8 can achieve a good imaging quality.

To sum up, Embodiments 1-8 respectively satisfy the relationships shown in Table 25 below.

TABLE 25

| Conditional Expression | Embodiment | | | | | | | |
|---|---|---|---|---|---|---|---|---|
| | 1 | 2 | 3 | 4 | 5 | 6 | 7 | 8 |
| V3/V1 | 0.48 | 0.48 | 0.48 | 0.48 | 0.48 | 0.48 | 1.14 | 0.48 |
| f/|f3| | 0.06 | 0.07 | 0.09 | 0.17 | 0.00 | 0.06 | 0.18 | 0.09 |
| TAN (HFOV) | 1.81 | 1.87 | 1.81 | 1.84 | 1.84 | 1.87 | 1.84 | 1.87 |
| f/f1 | −0.92 | −0.91 | −0.91 | −0.98 | −0.94 | −0.90 | −0.92 | −0.95 |
| f4/CT4 | 1.99 | 1.97 | 2.10 | 2.24 | 1.93 | 2.06 | 2.26 | 2.05 |
| SAG12/T12 | 1.58 | 1.54 | 1.84 | 1.61 | 1.65 | 1.59 | 1.50 | 1.57 |
| SAG21/SD21 | 0.37 | 0.38 | 0.42 | 0.39 | 0.35 | 0.37 | 0.40 | 0.39 |
| SAG42/CT4 | −0.54 | −0.59 | −0.53 | −0.59 | −0.55 | −0.55 | −0.62 | −0.58 |
| f/R2 | 1.42 | 1.47 | 1.41 | 1.54 | 1.44 | 1.40 | 1.49 | 1.50 |
| T34/T23 | 0.16 | 0.17 | 0.15 | 0.14 | 0.09 | 0.15 | 0.15 | 0.18 |

The present disclosure further provides an imaging device equipped with the wide-angle lens assembly described above. The imaging device may be an independent imaging device such as a digital camera, or may be an imaging module integrated in a mobile electronic device such as a mobile phone.

The foregoing is only a description for the preferred embodiments of the present disclosure and the applied technical principles. It should be appreciated by those skilled in the art that the inventive scope of the present disclosure is not limited to the technical solution formed by the particular combinations of the above technical features. The inventive scope should also cover other technical solutions formed by any combinations of the above technical features or equivalent features thereof without departing from the concept of the invention, for example, technical solutions formed by replacing the features as disclosed in the present disclosure with (but not limited to) technical features with similar functions.

What is claimed is:

1. A wide-angle lens assembly comprising, sequentially from an object side to an image side:
   a first lens having a negative refractive power, an image-side surface of the first lens being a concave surface;
   a second lens having a positive refractive power, an object-side surface of the second lens being a convex surface;
   a third lens having a refractive power; and
   a fourth lens having a positive refractive power, an image-side surface of the fourth lens being a convex surface;
   wherein a sagittal height SAG12 of the image-side surface of the first lens at a maximum effective radius and an air spacing T12 on an axis between the first lens and the second lens satisfy: 1.5≤SAG12/T12<2.0.

2. The wide-angle lens assembly according to claim 1, wherein an abbe number V1 of the first lens and an abbe number V3 of the third lens satisfy: 0.4<V3/V1≤1.2.

3. The wide-angle lens assembly according to claim 1, wherein an effective focal length f of the wide-angle lens assembly and an effective focal length f3 of the third lens satisfy: f/|f3|≤10.2.

4. The wide-angle lens assembly according to claim 1, wherein half of a maximal field-of-view HFOV of the wide-angle lens assembly satisfies: TAN(HFOV)≥1.6.

5. The wide-angle lens assembly according to claim 1, wherein an effective focal length f of the wide-angle lens assembly and an effective focal length f1 of the first lens satisfy: −1.2<f/f1<−0.8.

6. The wide-angle lens assembly according to claim 1, wherein an effective focal length f4 of the fourth lens and a center thickness CT4 of the fourth lens satisfy: 1.5<f4/CT4<2.5.

7. The wide-angle lens assembly according to claim 1, wherein an effective focal length f of the wide-angle lens assembly and a radius of curvature R2 of the image-side surface of the first lens satisfy: 1.2<f/R2≤1.7.

8. The wide-angle lens assembly according to claim 1, wherein an air spacing T23 on the axis between the second lens and the third lens and an air spacing T34 on the axis between the third lens and the fourth lens satisfy: 0<T34/T23<0.3.

9. An imaging device, comprising the wide-angle lens assembly according to claim 1.

10. A wide-angle lens assembly comprising, sequentially from an object side to an image side:
   a first lens having a negative refractive power, an image-side surface of the first lens being a concave surface;
   a second lens having a positive refractive power, an object-side surface of the second lens being a convex surface;
   a third lens having a refractive power; and
   a fourth lens having a positive refractive power, an image-side surface of the fourth lens being a convex surface;
   wherein a sagittal height SAG21 of the object-side surface of the second lens at a maximum effective radius and a maximum effective radius SD21 of the object-side surface of the second lens satisfy: 0.3<SAG21/SD21<0.5.

11. The wide-angle lens assembly according to claim 10, wherein an abbe number V1 of the first lens and an abbe number V3 of the third lens satisfy: 0.4<V3/V1≤1.2.

12. The wide-angle lens assembly according to claim 10, wherein an effective focal length f of the wide-angle lens assembly and an effective focal length f3 of the third lens satisfy: f/|f3|≤0.2.

13. The wide-angle lens assembly according to claim 10, wherein half of a maximal field-of-view HFOV of the wide-angle lens assembly satisfies: TAN(HFOV)≥1.6.

14. The wide-angle lens assembly according to claim 10, wherein an effective focal length f of the wide-angle lens assembly and an effective focal length f1 of the first lens satisfy: −1.2<f/f1<−0.8.

15. The wide-angle lens assembly according to claim 10, wherein an effective focal length f4 of the fourth lens and a center thickness CT4 of the fourth lens satisfy: 1.5<f4/CT4<2.5.

16. The wide-angle lens assembly according to claim 10, wherein an effective focal length f of the wide-angle lens assembly and a radius of curvature R2 of the image-side surface of the first lens satisfy: 1.2<f/R2≤1.7.

17. A wide-angle lens assembly comprising, sequentially from an object side to an image side:

a first lens having a negative refractive power, an image-side surface of the first lens being a concave surface;

a second lens having a positive refractive power, an object-side surface of the second lens being a convex surface;

a third lens having a refractive power; and a fourth lens having a positive refractive power, an image-side surface of the fourth lens being a convex surface;

wherein a sagittal height SAG42 of the image-side surface of the fourth lens at a maximum effective radius and a center thickness CT4 of the fourth lens satisfy: $-1.0 < SAG42/CT4 \leq -0.5$.

18. The wide-angle lens assembly according to claim 17, wherein an abbe number V1 of the first lens and an abbe number V3 of the third lens satisfy: $0.4 < V3/V1 \leq 1.2$.

19. The wide-angle lens assembly according to claim 17, wherein an effective focal length f of the wide-angle lens assembly and an effective focal length f3 of the third lens satisfy: $f/|f3| \leq 0.2$.

20. The wide-angle lens assembly according to claim 17, wherein half of a maximal field-of-view HFOV of the wide-angle lens assembly satisfies: $TAN(HFOV) \geq 1.6$.

\* \* \* \* \*